US009204598B2

(12) United States Patent
Velate et al.

(10) Patent No.: US 9,204,598 B2
(45) Date of Patent: Dec. 8, 2015

(54) SOLAR ENERGY FUNNELING USING THERMOPLASTICS FOR AGRICULTURAL APPLICATIONS

(71) Applicant: Saudi Basic Industries Corporation, Riyadh (SA)

(72) Inventors: Suresh Velate, Bangalore (IN); Pradeep Jeevaji Nadkarni, Bangalore (IN); M. Meerakani Sait, Tamil Nadu (IN); Vinod Kumar Vasudevan, Kerala (IN); Sankaran Nedumbamana, Bangalore (IN)

(73) Assignee: Saudi Basic Indsutries Corporation, Riyadh (SA)

( * ) Notice: Subject to any disclaimer, the term of this patent is extended or adjusted under 35 U.S.C. 154(b) by 170 days.

(21) Appl. No.: 13/937,963

(22) Filed: Jul. 9, 2013

(65) Prior Publication Data
US 2014/0345195 A1    Nov. 27, 2014

(51) Int. Cl.
| A01G 7/06 | (2006.01) |
| C09K 11/02 | (2006.01) |
| A01G 7/04 | (2006.01) |
| A01G 9/14 | (2006.01) |
| C09K 11/06 | (2006.01) |

(52) U.S. Cl.
CPC .............. *A01G 7/045* (2013.01); *A01G 9/1407* (2013.01); *A01G 9/1438* (2013.01); *C09K 11/02* (2013.01); *C09K 11/06* (2013.01); *C09K 2211/1007* (2013.01); *C09K 2211/1011* (2013.01); *C09K 2211/1014* (2013.01); *C09K 2211/1044* (2013.01); *C09K 2211/1475* (2013.01)

(58) Field of Classification Search
CPC .................. C09K 11/06; C09K 11/02; C09K 2211/1475; C09K 5/0041; A01G 9/1407; A01G 9/1438
USPC .......... 252/301.35; 47/58.1 LS; 428/220, 690
See application file for complete search history.

(56) References Cited

U.S. PATENT DOCUMENTS

| 3,544,573 | A | 12/1970 | Christmann ................... 544/245 |
| 4,189,866 | A | 2/1980 | Treadaway ..................... 47/29.4 |
| 4,452,720 | A | 6/1984 | Harada et al. ............. 252/301.16 |
| 4,529,269 | A | 7/1985 | Mutzhas ........................ 359/359 |
| 4,725,690 | A | 2/1988 | Graser ............................. 546/37 |
| 5,154,770 | A | 10/1992 | Spietschka et al. ........... 106/498 |
| 5,561,232 | A | 10/1996 | Hao et al. ........................ 546/14 |
| 5,605,761 | A | 2/1997 | Burns et al. .................... 428/412 |
| 5,674,622 | A | 10/1997 | Burns et al. .................... 428/412 |
| 5,710,197 | A | 1/1998 | Fischer et al. ................... 524/82 |
| 5,816,238 | A | 10/1998 | Burns et al. .................... 126/569 |
| 5,830,931 | A | 11/1998 | Pelster et al. .................... 524/90 |
| 5,920,429 | A | 7/1999 | Burns et al. .................... 359/515 |
| 5,981,773 | A | 11/1999 | Langhals et al. ............... 549/381 |
| 6,178,809 | B1 | 1/2001 | Cavestri ........................ 73/40.7 |
| 6,221,150 | B1 | 4/2001 | Weber et al. .................... 106/498 |
| 6,312,132 | B1 | 11/2001 | Pavelka et al. ................. 359/530 |
| 6,391,104 | B1 | 5/2002 | Schulz ............................ 106/494 |
| 6,491,749 | B1 | 12/2002 | Langhals et al. ......... 106/287.21 |
| 6,533,961 | B2 | 3/2003 | Harelstad et al. .......... 252/301.35 |
| 6,572,977 | B1 | 6/2003 | Pavelka et al. ................. 428/500 |
| 6,589,450 | B1 | 7/2003 | Bratkova et al. ............... 252/584 |
| 6,997,983 | B2 | 2/2006 | Chamberlain et al. ........ 106/493 |
| 7,037,962 | B2 | 5/2006 | Destro et al. .................... 524/89 |
| 7,582,720 | B2 | 9/2009 | Rudiger et al. ................ 528/196 |
| 7,718,238 | B2 | 5/2010 | Schottland .................... 428/34.1 |
| RE41,616 | E | 8/2010 | Hubbard et al. ............... 528/196 |
| 7,879,927 | B2 | 2/2011 | Vlottes et al. ................... 524/83 |
| 8,299,354 | B2 | 10/2012 | Bhaumik et al. ............... 136/257 |
| 8,304,645 | B2* | 11/2012 | Bhaumik et al. ............... 136/247 |
| 8,304,647 | B2 | 11/2012 | Bhaumik et al. ............... 136/257 |
| 8,314,325 | B2* | 11/2012 | Bhaumik et al. ............... 136/247 |
| 8,400,707 | B2 | 3/2013 | Miteva et al. .................. 359/326 |
| 2003/0203211 | A1 | 10/2003 | Wei et al. ....................... 428/412 |
| 2003/0203212 | A1 | 10/2003 | Wei et al. ....................... 428/412 |
| 2006/0072444 | A1 | 4/2006 | Engel et al. ................. 369/275.1 |
| 2006/0135774 | A1 | 6/2006 | Weber et al. .................... 546/37 |
| 2007/0221884 | A1 | 9/2007 | Hoppe et al. ............. 252/301.28 |
| 2008/0149164 | A1 | 6/2008 | Goedmakers et al. ........ 136/247 |
| 2009/0126778 | A1* | 5/2009 | Brounne et al. ............... 136/247 |
| 2009/0205701 | A1 | 8/2009 | Govaerts et al. ............... 136/247 |
| 2010/0043875 | A1* | 2/2010 | Bhaumik et al. ............... 136/256 |
| 2010/0043878 | A1* | 2/2010 | Bhaumik et al. ............... 136/257 |
| 2010/0043879 | A1* | 2/2010 | Bhaumik et al. ............... 136/257 |
| 2010/0043880 | A1* | 2/2010 | Bhaumik et al. ............... 136/257 |
| 2010/0065200 | A1 | 3/2010 | Sarver et al. ................ 156/272.8 |
| 2010/0186801 | A1 | 7/2010 | Boehm et al. .................. 136/254 |

(Continued)

FOREIGN PATENT DOCUMENTS

| CA | 752859 | 2/1967 |
| CA | 2312871 | 6/1999 |
| DE | 2451781 | 1/1976 |
| DE | 3422757 | 1/1986 |
| DE | 3703495 | 8/1988 |
| DE | 38 18 986 | 12/1988 |
| DE | 4037735 | 6/1992 |
| DE | 19548411 | 6/1997 |
| DE | 19935179 | 2/2001 |
| DE | 10132116 | 1/2003 |
| DE | 10233179 | 2/2004 |
| DE | 102005034385 | 2/2007 |
| DE | 102005038665 | 2/2007 |

(Continued)

OTHER PUBLICATIONS

Extended European Search Report issued in Application No. EP 14 17 1006, dated Nov. 12, 2014.

*Primary Examiner* — Carol M Koslow
(74) *Attorney, Agent, or Firm* — Norton Rose Fulbright US LLP

(57) ABSTRACT

Disclosed is a wavelength-conversion material, and methods for its use, that includes an organic fluorescent dye and a polymeric matrix, wherein the organic fluorescent dye is solubilized in the polymeric matrix, and wherein the polymeric matrix is capable of absorbing light comprising a wavelength of 500 to 700 nm and emitting the absorbed light at a wavelength of greater than 550 to 800 nm.

33 Claims, 4 Drawing Sheets

(56) References Cited

U.S. PATENT DOCUMENTS

| | | | |
|---|---|---|---|
| 2011/0197503 A1 | 8/2011 | Usami | 47/58.1 LS |
| 2012/0034679 A1 | 2/2012 | Falber | 435/257.1 |
| 2012/0157586 A1 | 6/2012 | Dern et al. | 524/88 |
| 2013/0074929 A1* | 3/2013 | Shimoi et al. | 136/257 |

FOREIGN PATENT DOCUMENTS

| | | |
|---|---|---|
| DE | 102005045375 | 3/2007 |
| DE | 102006011269 | 9/2007 |
| DE | 102006017000 | 10/2007 |
| DE | 102007061052 | 6/2009 |
| DE | 102008036495 | 2/2010 |
| DE | 102010011065 | 10/2010 |
| DE | 102010023469 | 12/2011 |
| EP | 97359 | 6/1983 |
| EP | 579835 | 11/1992 |
| EP | 654506 | 5/1995 |
| EP | 732049 | 9/1996 |
| EP | 792907 * | 9/1997 |
| EP | 1956435 | 8/2008 |
| EP | 2008320 | 12/2008 |
| EP | 2301746 | 3/2011 |
| EP | 0 792 907 | 9/2014 |
| JP | 57-86822 | 5/1982 |
| JP | 63193960 | 8/1988 |
| JP | H04500935 | 2/1992 |
| JP | 6-46685 | 2/1994 |
| JP | 8-140499 | 6/1996 |
| JP | H093311 | 1/1997 |
| JP | 2634072 | 7/1997 |
| JP | 1075655 | 3/1998 |
| JP | 11196685 | 7/1999 |
| JP | 2006149264 | 6/2006 |
| JP | 2007135583 | 6/2007 |
| JP | 4048073 | 2/2008 |
| JP | 4082917 | 4/2008 |
| JP | 2008127557 | 6/2008 |
| JP | 4302836 | 7/2009 |
| JP | 2010159356 | 7/2010 |
| JP | 4666940 | 4/2011 |
| JP | 2011171389 | 9/2011 |
| JP | 2012085649 | 5/2012 |
| JP | 2013000006 | 1/2013 |
| KR | 2009085941 | 8/2009 |
| KR | 10-984329 | 9/2010 |
| KR | 2012125760 | 11/2012 |
| WO | WO 01/92420 | 12/2001 |
| WO | WO 2009/064860 | 5/2009 |
| WO | WO 2011/134674 | 11/2011 |
| WO | WO 2011/149028 * | 12/2011 |
| WO | WO 2012/042434 | 4/2012 |
| WO | WO 2012/094409 | 7/2012 |
| WO | WO 2012/107852 | 8/2012 |
| WO | WO 2012/113884 | 8/2012 |
| WO | WO 2012/134992 | 10/2012 |
| WO | WO 2012/168395 | 12/2012 |
| WO | WO 2013/018041 | 2/2013 |

* cited by examiner

SOLAR ENERGY FUNNELING USING THERMOPLASTICS FOR AGRICULTURAL APPLICATIONS

BACKGROUND OF THE INVENTION

A. Field of the Invention

The invention generally concerns the use of materials such as greenhouse films or sheets that are capable converting light into a more acceptable form for agricultural and plant growing purposes. In particular, the materials include organic fluorescent dyes or combinations of such dyes (e.g., perylene and/or perinone compounds) that are solubilized within a polymeric matrix, where the polymeric matrix containing the solubilized fluorescent dye is capable of absorbing light comprising a wavelength of 500 to 700 nm and emitting the absorbed light at a wavelength of greater than 550 to 800 nm.

B. Description of Related Art

Plants rely on light within the Photosynthetically Active Radiation (PAR) region as a source of energy for photosynthesis. The PAR region is typical referred to as light or radiation having a wavelength between 400 to 700 nanometers. Of this, light having a wavelength of about 400 to 500 nanometers (or blue light) and 600 to 700 nanometers (or red light) are more efficiently used by plants in the photosynthesis process. Red light is also known to promote plant germination and rooting. By comparison, light having a wavelength between about 500 to 600 nanometers (or green/yellow light) is not efficiently used by plants. Further, light having a wavelength of about 700 to 800 nanometers (or far-red light) promotes petiole elongation while inhibiting germination and rooting in plants.

There have been several attempts to positively impact plant growth by manipulating the amount of red to far-red light ("Red to Far-Red Ratio" or "R:FR") that a plant receives. Increasing the R:FR can increase plant growth and quality, whereas decreasing the R:FR ratio can decrease plant growth and quality. These attempts typically involve the use of greenhouse materials that are designed to manipulate natural sunlight passing through the materials. One of the more prevalent strategies is to selectively absorb light in one of the two red regions with pigments—pigments can absorb certain light and reflect others but are inefficient at converting light from one wavelength to another. For example, absorbing far-red light more than red-light leads to an increase in the Red/Far-Red ratio.

Other strategies attempt to increase the transmittance of the more important light ranges from 400 to 500 nm or 600 to 700 nm, while simultaneously reflecting the least important range of 500 to 600 nm (see U.S. Pat. No. 4,529,269). The goal of such a strategy is to simply focus on the growth important light and ignore the remaining "unimportant light."

Problems associated with the current greenhouse materials are at least three-fold. First, several of the compounds and pigments used are not sufficiently stable from either a photo or thermal stability perspective. This is problematic given that greenhouse materials are typically subjected to prolonged outdoor use. Second, pigments are insoluble particles and have a tendency to coalesce together, which can create uneven distribution into a given material, thereby negatively affecting the efficacy of the material (e.g., some portions of the material may not have pigments or an insufficient amount to perform the desired result). Further, their insolubility limits the amount that can be used in a given material. Third, current strategies do not efficiently modify the R:FR ratio. Either several different types of ingredients are typically used to achieve an acceptable ratio or the strategies appear to be limited to the amount of red/far red light present in natural sunlight.

SUMMARY OF THE INVENTION

It has been discovered that certain organic fluorescent dyes can be used to convert green/yellow light to more useable red light in plant growing applications (e.g., greenhouse materials such as films or sheets). This discovery provides several solutions to the problems existing with the current state of the art in this field. For one, instead of discarding or ignoring the undesirable green/yellow light, it actually converts such light to a more useable red-light. This has the benefit of directly increasing the R:FR ratio without the need for other ingredients. It creates a new source of the desirable red light. Also, the fluorescent dyes have photo and thermal stability and can be used in plant growing applications. Further, and unlike pigments, the dyes can be solubilized into a polymeric matrix, which increases the amount of the dyes present within a given matrix and evenly disperses the dyes throughout the matrix. This increased solubility ensures that the resulting polymeric matrix or material provides consistent light converting properties across the entire surface of the material.

In one aspect of the present invention, there is disclosed a wavelength-conversion material comprising an organic fluorescent dye and a polymeric matrix, wherein the organic fluorescent dye is solubilized in the polymeric matrix, and wherein the fluorescent dye solubilized in the polymeric matrix is capable of absorbing light comprising a wavelength of 500 to 700 nm and emitting the absorbed light at a wavelength of greater than 550 to 800 nm. In some aspects, the polymeric matrix is capable of absorbing light comprising a wavelength of 500 to 600 nm and emitting the absorbed light at a wavelength of greater than 600 to 700 nm or 600 to 800 nm. The wavelength-conversion material can be transparent, translucent, or opaque. In particular aspects, it is either transparent or translucent. The polymeric matrix can be formed into a film or a sheet. The film or sheet can be a single-layered or multi-layered film. The film or sheet can be adhered to another surface (e.g., a window). The film or sheet can have a thickness of 10 to 300 µm or from 0.5 to 3 mm. The polymeric matrix can be embedded into another material (e.g., a window, windshield, etc.). The polymeric matrix or wavelength-conversion material can be comprised in a structure such as one used to grow plants (e.g., a greenhouse, a terrarium, a conservatory, a herbarium, an arboretum, a nursery, or a bioreactor). The organic fluorescent dyes and/or wavelength-conversion material can have a stoke shift of 60 to 120 nanometers. The polymeric matrix, the fluorescent dyes, or wavelength-conversion material is thermally stable at a temperature from 200 to 350° C. In particular embodiments, the organic fluorescent dye can be a perylene containing compound, non-limiting examples of which are provided throughout this specification and incorporated into this section by reference. The perylene containing compound can be a perylene diimide. The perylene diimide can have a structure of:

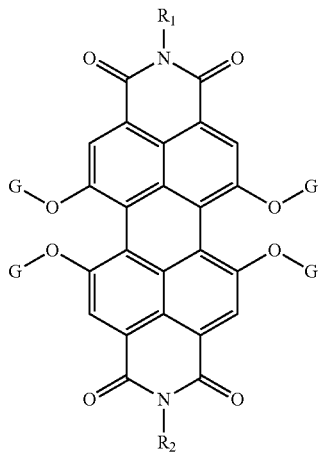

wherein $R_1$ and $R_2$ are each independently selected from branched $C_6$-$C_{18}$ alkyl and phenyl which is disubstituted by $C_1$-$C_5$ alkyl; and G is independently selected from

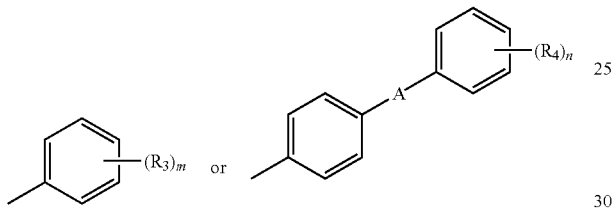

wherein $R_3$ is independently selected from hydrogen, $C_8$-$C_{12}$ alkyl and halogen; m represents the number of substituents and is an integer from 0 to 5; $R_4$ is independently selected from hydrogen, $C_1$-$C_{12}$ alkyl, $C_6$-$C_{20}$ aromatic, and $C_6$-$C_{20}$ cycloalkyl; n represents the number of substituents and is an integer from 0 to 5; and A is selected from a bond, $C_1$-$C_{12}$ alkyl, $C_6$-$C_{20}$ aromatic, and $C_6$-$C_{20}$ cycloalkyl. Specific non-limiting structures of the perylene dyes are provided in the detailed description and examples section of this specification and are incorporated into this section by reference. In another embodiment, the perylene containing compound can have a structure of:

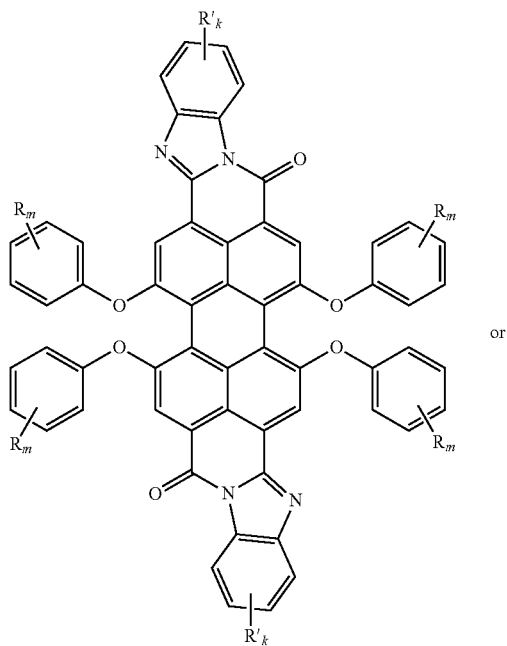

or

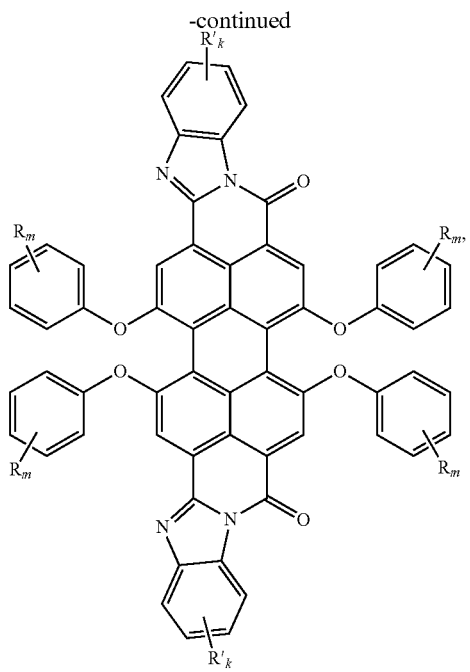

wherein R and R' are each independently selected from $C_8$-$C_{18}$ alkyl, substituted $C_8$-$C_{18}$ alkyl, $C_8$-$C_{18}$ alkoxy, substituted $C_8$-$C_{18}$ alkoxy, and halogen; m represents the number of R substituents on each phenoxy ring, wherein each m is independently an integer from 0 to 5; and k represents the number of R' substituents on each benzimidazole group, wherein each k is independently an integer from 0 to 4. Specific non-limiting structures of the above perylene compounds are provided in the detailed description and examples section of this specification and are incorporated into this section by reference. In certain aspects, the polymeric matrices of the present invention can include a combination of various perylene compounds. Also, and in addition to the perylene compounds, the organic fluorescent dye can be a coumarin dye, a carbocyanine dye, a phthalocyanine dye, an oxazine dye, a carbostyryl dye, a porphyrin dye, an acridine dye, an anthraquinone dye, an arylmethane dye, a quinone imine dye, a thiazole dye, a bis-benzoxazolylthiophene (BBOT) dye, a perinone dye, or a xanthene dye, or any combination of dyes thereof. In certain embodiments, the polymeric matrix can include at least two, three, four, five, six, seven, eight, nine, or ten or more different dyes. In instances where a first and second dye is present in the matrix, the ratio of the first organic fluorescent dye to the second organic fluorescent dye can be from 1:50 to 1:1 to 50:1. The polymeric matrix can include a polycarbonate, a polyolefin, a polymethyl(meth)acrylate, a polyester, an elastomer, a polyvinyl alcohol, a polyvinyl butyral, polystyrene, or a polyvinyl acetate, or any combination thereof. In particular embodiments, the polymeric matrix comprises a polycarbonate or a polyolefin or a combination thereof. Examples of polyolefin polymers include polyethylene or polypropylene polymer. Examples of polyethylene polymers include low-density polyethylene polymers, linear low-density polyethylene polymers, or high-density polyethylene polymers. In some aspects, the polymeric matrix can include an additive. Such additives can be used in a variety of ways (e.g., to increase the structural integrity of the matrix or material, to increase the absorption efficiency of the matrix or material, to aid in dispersing the dyes throughout the matrix, to block ultraviolet rays, infrared rays, etc.). In some instances, the additive can be an ultraviolet absorbing compound, an optical brightener, an ultraviolet stabilizing agent, a heat stabilizer, a diffuser, a mold releasing agent, an antioxidant, an antifogging agent, a clarifier, a nucleating agent, a phosphite or a phosphonite or both, a light stabilizer, a singlet oxygen quencher, a processing aid, an antistatic agent, a filler or a reinforcing material, or any combination thereof. An example of an optical brightener is 2,2'-(2,5-thiophenediyl)bis(5-tert-butylbenzoxazole). In certain aspects, the additive can be a diketopyrrolo-pyrrole (DPP) containing compound. Non-limiting examples of DPP compounds include those having the following structure:

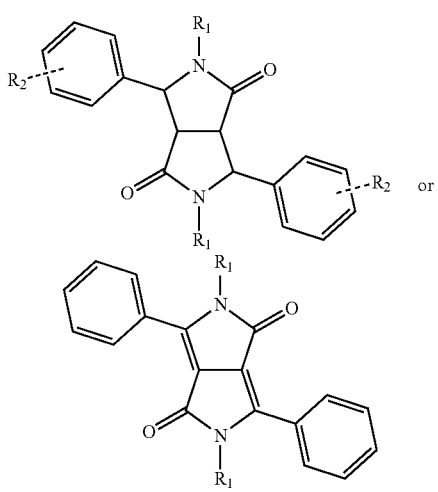

wherein $R_1$ and $R_2$ can each individually be H, $CH_3$, $CH_2H_5$, 2-ethylhexyl, an amine, or a halogen (e.g., Cl). In particular, embodiments, $R_1$ and $R_2$ are each hydrogen. In other instances, $R_1$ can be hydrogen and $R_2$ can be a halogen such as Cl. Other derivatives of DPP can also be used in the context of the present invention such that the $R_1$ and $R_2$ groups can be $C_1$ to $C_8$ linear and branched alkyl groups, phenol groups, etc. In some embodiments, the additive can be a pigment. In other embodiments, the polymeric matrix or wavelength conversion material does not include a pigment or does not include a perylene-based pigment. The polymeric matrix or wavelength converting material can be designed such that it is also capable of absorbing ultraviolet light comprising a wavelength of 280 to 400 nm. In such cases, the polymer matrix can further include an ultraviolet light absorbing compound that is capable of absorbing ultraviolet light comprising a wavelength 280 to 400 nm. In particular instances, the ultraviolet light absorbing compound is capable of emitting said absorbed light in the range of 400 to 800 nm or 400 to 500 nm, or 600 to 700 nm, or 600 to 800 nm. The ultraviolet light absorbing compound can be capable of absorbing ultraviolet A light comprising a wavelength of 315 to 400 nm, wherein said compound can be avobenzone (Parsol 1789), Bisdisulizole disodium (Neo Heliopan AP), Diethylamino hydroxybenzoyl hexyl benzoate (Uvinul A Plus), Ecamsule (Mexoryl SX), or Methyl anthranilate, or any combination thereof. The ultraviolet light absorbing compound can be capable of absorbing ultraviolet B light comprising a wavelength of 280 to 315 nm, wherein said compound can be 4-Aminobenzoic acid (PABA), Cinoxate, Ethylhexyl triazone (Uvinul T 150), Homosalate, 4-Methylbenzylidene camphor (Parsol 5000), Octyl methoxycinnamate (Octinoxate), Octyl salicylate (Octisalate), Padimate O (Escalol 507), Phenylbenzimidazole sulfonic acid (Ensulizole), Polysilicone-15 (Parsol SLX), Trolamine salicylate. The ultraviolet light absorbing compound can be capable of absorbing ultraviolet A and B light comprising a wavelength of 280 to 400 nm, wherein said compound can be Bemotrizinol (Tinosorb S), Benzophenones 1 through 12, Dioxybenzone, Drometrizole trisiloxane (Mexoryl XL), Iscotrizinol (Uvasorb HEB), Octocrylene, Oxybenzone (Eusolex 4360), or Sulisobenzone. The polymeric matrix or wavelength conversion material is capable of emitting more of the absorbed light at a wavelength of 600 to 700 nm than at a wavelength of 700 to 800 nm, thereby increasing the red to far red ratio of the emitted light. In some instances, the polymeric matrix can further include a diffuser, non-limiting examples of which include the TOSPEARL® series diffusers that are silica-based compounds, and are commercially available from Momentive Performance Materials, Inc. (e.g., TOSPEARL® 120, TOSPEARL® 130, TOSPEARL® 240, TOSPEARL® 3120, or TOSPEARL® 2000). The diffuser can be an inorganic material comprising antimony, titanium, barium, or zinc, or oxides thereof, and mixtures thereof. In some instances, the organic fluorescent dye is not present on, attached to, or incorporated in silicone flakes or wherein the matrix is not present on, attached to, or incorporated in silicone flakes.

In a further aspect of the invention there is disclosed a method of increasing the red to far red (R:FR) ratio of red light that a plant receives comprising converting light comprising a wavelength of 500 to 700 nm into light comprising a wavelength of greater than 550 to 800 nm with any one of the wavelength-conversion materials or matrixes discussed above and throughout this specification. The method can further include subjecting the plant to the converted light, wherein the R:FR ratio of red light that a plant receives is increased by at least 5, 10, 15, 20, 30, 40, or 50% or more in the presence of the converted light when compared with the R:FR ratio of red light that a plant receives in the absence of said converted light. The majority of the converted light can include a wavelength of 600 to 700 nm. In some instances, the R:FR ratio can be measured by using specific absorbances for red and far-red light such as 660 nm for red and 730 nm for far-red. The 660/730 Sensor (Red/Far Red) commercially available from Skye Instruments Ltd. (United Kingdom) can be used. The light source can be natural sunlight or can be non-natural light produced from a light source such as a lamp. As noted above, the wavelength-conversion material can be a film or sheet. The material can be comprised in a greenhouse, a terrarium, a conservatory, a herbarium, an arboretum, a nursery, or a bioreactor or other type of facility that can grow plants.

Another embodiment of the present invention includes a method for growing a plant (e.g., vegetables, herbs, flowers, legumes, fruits, vines, succulents, bushes, trees, etc.) comprising converting light comprising a wavelength of 500 to 700 nm into light comprising a wavelength of greater than 550 to 800 nm with any one of the wavelength-conversion materials or matrices discussed above or throughout the specification. The method can further include subjecting the plant to the converted light. Again, the light source can be natural sunlight or can be non-natural light produced from a light source such as a lamp. As noted above, the wavelength-conversion material can be a film or sheet. The material can be comprised in a greenhouse, a terrarium, a conservatory, a herbarium, an arboretum, a nursery, or a bioreactor or other type of facility that can grow plants. The rate of growth of the plant can be increased when compared with the rate of growth of a plant that is not subjected to the converted light. The wavelength-conversion material or matrices can be used to increase the R:FR ratio that a plant receives.

In another aspect of the present invention there is disclosed a method of converting light comprising subjecting light comprising a wavelength of 500 to 700 nm with any one of the wavelength-conversion materials or matrices of the present invention, wherein said light is converted into light comprising a wavelength of greater than 550 to 800 nm. The converted light can have a R:FR ratio of at least 0.5:1 to 10:1, or from at least 1:1 to 10:1, or at least greater than 1:1. The converted light can comprise a wavelength of 600 to 700 nm. The light source can be natural sunlight or can be non-natural light produced from a light source such as a lamp. As noted above, the wavelength-conversion material can be a film or sheet or can be a window or other transparent object. Plants of all types can be subjected to the converted light. As noted above, the wavelength-conversion material can be a film or sheet. The material can be comprised in a greenhouse, a terrarium, a conservatory, a herbarium, an arboretum, a nursery, or a bioreactor or other type of facility that can grow plants.

The term "greenhouse" refers to a structure used to grow plants including vegetables, herbs, flowers, legumes, fruits, vines, succulents, trees, etc. In a typical greenhouse, enclosures allow for control of lighting, moisture and humidity for any given plant. "Greenhouse" includes a terrarium, a conservatory, herbarium, arboretum, or nursery.

The term "integer" means a whole number and includes zero. For example, the expression "n is an integer from 0 to 4" means n may be any whole number from 0 to 4, including 0.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The term "aliphatic" refers to a linear or branched array of atoms that is not cyclic and has a valence of at least one. Aliphatic groups are defined to comprise at least one carbon atom. The array of atoms may include heteroatoms such as nitrogen, sulfur, silicon, selenium and oxygen or may be composed exclusively of carbon and hydrogen ("Alkyl"). Aliphatic groups may be substituted or unsubstituted. Examples of aliphatic groups include, but are not limited to, methyl, ethyl, isopropyl, isobutyl, chloromethyl, hydroxymethyl (—CH$_2$OH), mercaptomethyl (—CH$_2$SH), methoxy, methoxycarbonyl (CH$_3$OCO—), nitromethyl (—CH$_2$NO$_2$), and thiocarbonyl.

The term "alkyl" refers to a linear or branched array of atoms that is composed exclusively of carbon and hydrogen. The array of atoms may include single bonds, double bonds, or triple bonds (typically referred to as alkane, alkene, or alkyne). Alkyl groups may be substituted or unsubstituted. Examples of alkyl groups include, but are not limited to, methyl, ethyl, and isopropyl.

The term "aromatic" refers to an array of atoms having a valence of at least one and comprising at least one aromatic group. The array of atoms may include heteroatoms such as nitrogen, sulfur, selenium, silicon and oxygen, or may be composed exclusively of carbon and hydrogen. The aromatic group may also include nonaromatic components. For example, a benzyl group is an aromatic group that comprises a phenyl ring (the aromatic component) and a methylene group (the nonaromatic component). Examples of aromatic groups include, but are not limited to, phenyl, pyridyl, furanyl, thienyl, naphthyl, biphenyl, 4-trifluoromethylphenyl, 4-chloromethylphen-1-yl, and 3-trichloromethylphen-1-yl (3-CCl$_3$Ph-).

The terms "cycloaliphatic" and "cycloalkyl" refer to an array of atoms which is cyclic but which is not aromatic. The cycloaliphatic group may include heteroatoms such as nitrogen, sulfur, selenium, silicon and oxygen, or may be composed exclusively of carbon and hydrogen. A cycloalkyl group is composed exclusively of carbon and hydrogen. A cycloaliphatic group may comprise one or more noncyclic components. For example, a cyclohexylmethyl group (C$_6$H$_{11}$CH$_2$) is a cycloaliphatic functionality, which comprises a cyclohexyl ring (the array of atoms which is cyclic but which is not aromatic) and a methylene group (the noncyclic component). Exemplary cycloaliphatic groups include, but are not limited to, cyclopropyl, cyclobutyl, 1,1,4,4-tetramethylcyclobutyl, piperidinyl, and 2,2,6,6-tetramethylpiperydinyl.

The term "alkoxy" refers to an array of atoms containing an alkyl group and an oxygen atom at one end. Alkyl groups may be substituted or unsubstituted. Examples of alkoxy groups include methoxy(—OCH$_3$) and ethoxy(—OCH$_2$CH$_3$). A related group is "phenoxy," which refers to a phenyl group having an oxygen atom attached to one carbon. The phenoxy group may also be substituted or unsubstituted.

The term "about" or "approximately" are defined as being close to as understood by one of ordinary skill in the art, and in one non-limiting embodiment the terms are defined to be within 10%, preferably within 5%, more preferably within 1%, and most preferably within 0.5%.

The use of the word "a" or "an" when used in conjunction with the term "comprising" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The wavelength-conversion materials, organic fluorescent dyes, and/or polymeric matrices of the present invention can "comprise," "consist essentially of," or "consist of" particular ingredients, components, compositions, etc. disclosed throughout the specification. With respect to the transitional phase "consisting essentially of," in one non-limiting aspect, a basic and novel characteristic of the wavelength-conversion materials and/or the organic fluorescent dyes of the present invention are their ability to efficiently absorb light comprising a wavelength of 500 to 700 nm and emitting the absorbed light at a wavelength of greater than 550 to 800 nm.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description.

DETAILED DESCRIPTION OF THE INVENTION

Plant photosynthesis is a relatively inefficient process. Chlorophyll A and B absorb energy from sunlight, thereby starting the photosynthesis process. The problem, however, is that sunlight has a relatively high intensity between 450 to 600 nm. By comparison, chlorophyll A and B are very inefficient at absorbing light within this range (see FIG. 1). While certain materials have been developed to increase the amount of useable sunlight that a plant receives (e.g., converting harmful ultraviolet light to blue or red light; reflecting ultraviolet light, green light, yellow light, and infrared light, etc.), such materials tend to be unstable, limited in their application, or fail to leverage the most intense form of light that sunlight has to offer, green and yellow light.

Figure 1:
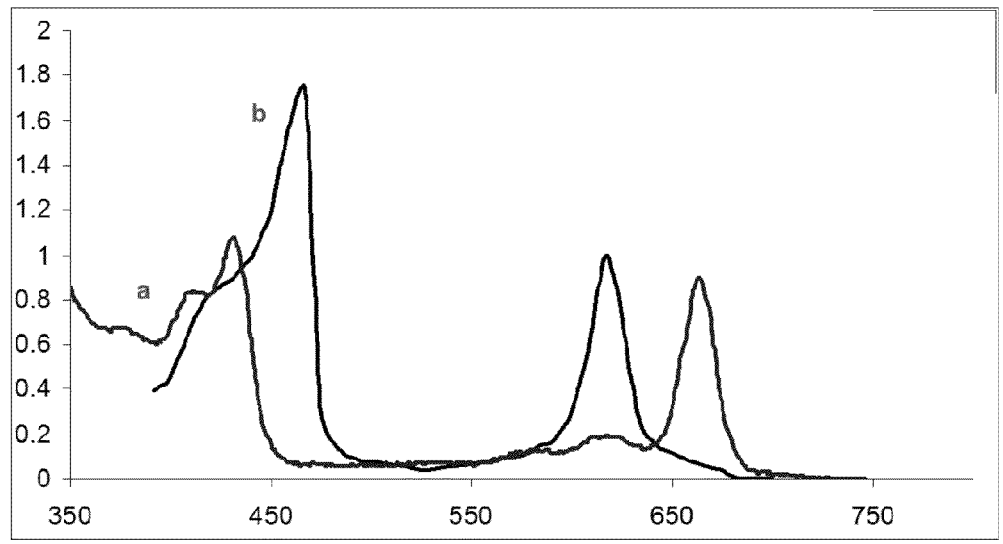
FIG. 1: Absorption spectrum of a) Chlorophyll A; and b) Chlorophyll B.

It was discovered that certain organic fluorescent dyes can be solubilized in a polymer matrix and used in wavelength-conversion materials to aid plant growth. These materials work by absorbing light that plants are inefficient at absorbing and converting said light to light that plants can efficiently absorb. In particular, the materials can absorb the unusable green and yellow light and subsequently emit the absorbed light into more useable red light. As illustrated in FIG. 1, chlorophyll A and B both are efficient at absorbing red light (around 600 to 700 nm). Therefore, the materials of the present invention can increase the efficiency of the photosynthesis process. Further, red light is known to promote plant germination and rooting. By comparison, far-red light (around 700 to 800 nm) promotes petiole elongation while inhibiting germination and rooting in plants. By emitting more red light, the materials of the present invention also increase the Red/Far-Red (R:FR) ratio of light that a plant receives. Increasing this ratio positively affects the growth and quality of the plant.

These and other non-limiting aspects of the present invention are discussed in further detail in the following sections.

A. Organic Fluorescent Dyes

A variety of organic fluorescent dyes can be used in the context of the present invention. In particular embodiments, perylene-based dyes can be used in the wavelength-conversion material of the present invention. The dyes are capable of absorbing light comprising a wavelength of 500 to 700 nm or 500 to 600 nm and emitting the absorbed light at a wavelength of greater than 550 to 800 nm or 600 to 800 nm or 600 to 700 nm.

Perylene-based organic fluorescent dyes are derived from perylene, which has the following chemical structure:

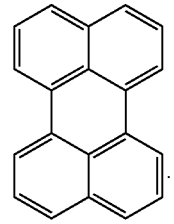 [SMILES: c1cc2cccc3c4cccc5cccc(c(c1)c23)c54]

Non-limiting examples of perylene-based dyes that can be used are described in U.S. Pat. Nos. 8,299,354, 8,304,645, and 8,304,647, the disclosures of which are incorporated by reference.

In one particular instance, the structure of the perylene-based organic fluorescent dye can be a perylene diimide of Formula (I):

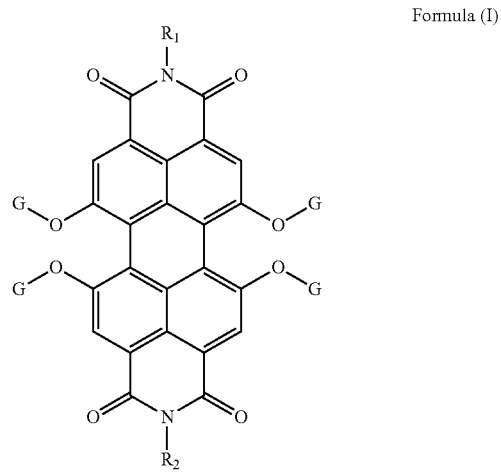

Formula (I)

wherein $R_1$ and $R_2$ are each independently selected from branched $C_6$-$C_{18}$ alkyl and phenyl which is disubstituted by $C_1$-$C_5$ alkyl; and G is independently selected from Formulas (Ia) and (Ib):

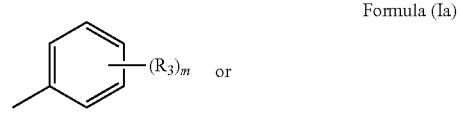

Formula (Ia)

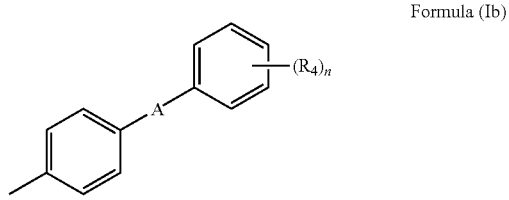

Formula (Ib)

wherein $R_3$ is independently selected from hydrogen, $C_8$-$C_{12}$ alkyl and halogen; m represents the number of substituents and is an integer from 0 to 5; $R_4$ is independently selected from hydrogen, $C_1$-$C_{12}$ alkyl, $C_6$-$C_{20}$ aromatic, and $C_6$-$C_{20}$ cycloalkyl; n represents the number of substituents and is an integer from 0 to 5; and A is selected from a bond, $C_1$-$C_{12}$ alkyl, $C_6$-$C_{20}$ aromatic, and $C_6$-$C_{20}$ cycloalkyl. In particular embodiments, $R_1$ and $R_2$ are independently selected from branched $C_6$-$C_{18}$ alkyl; each $R_3$ is independently selected from $C_8$-$C_{12}$ alkyl; and m is an integer from 1 to 5. The four G groups can be the same or different. In one aspect, the G group can be

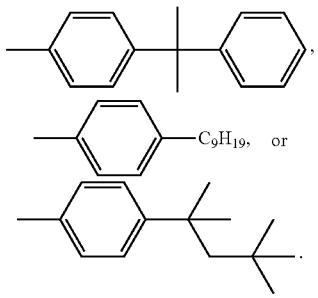

In particular embodiments, the G group is Formula (Ib).

In one aspect, the perylene diimide fluorescent dye has a structure of Formulas (II), (III), (IV), (V), or (VI):

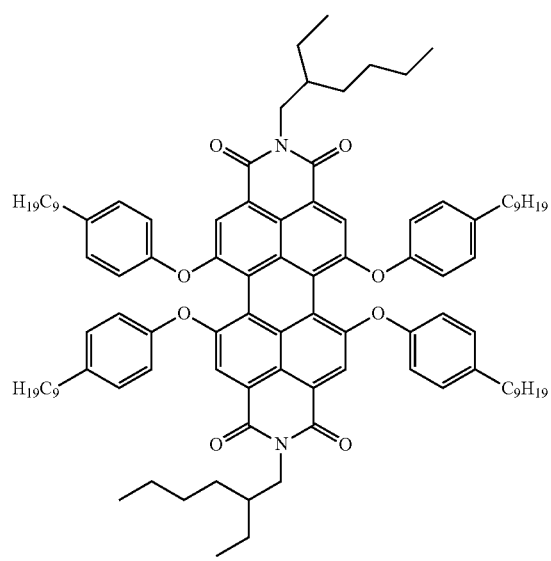

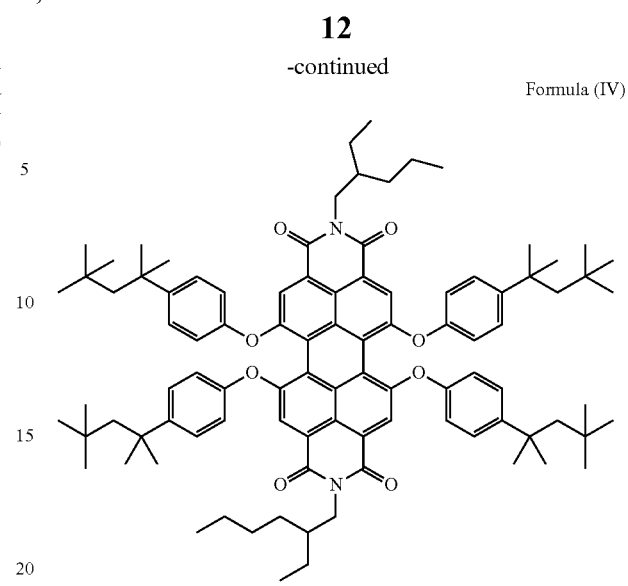

In another aspect, the perylene diimide fluorescent dyes can be based on the Lumogen® series of dyes, which are commercially available from BASF. In one particular instance, the following Lumogen® F Red 305 dye can be used:

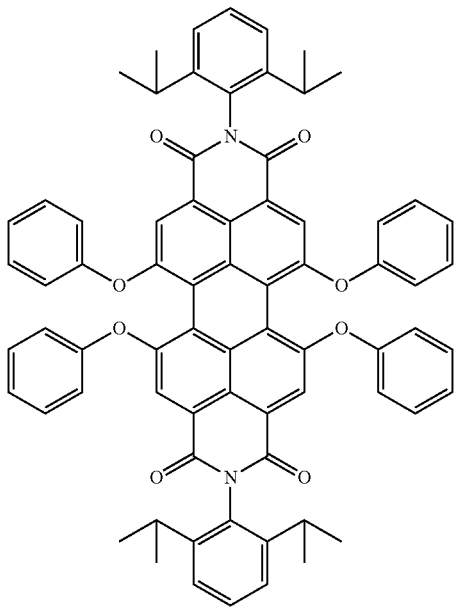 [SMILES: CC(C)c1cccc(C(C)C)c1N1C(=O)c2cc(Oc3ccccc3)c3c4c(Oc5ccccc5)cc5c6c(cc(Oc7ccccc7)c(c7c(Oc8ccccc8)cc(c2c37)C1=O)c64)C(=O)N(c1c(C(C)C)cccc1C(C)C)C5=O]

A method for making the above-noted compounds is provided in U.S. Pat. No. 8,304,647, which again is incorporated by reference. In general, the following reaction scheme can be used:

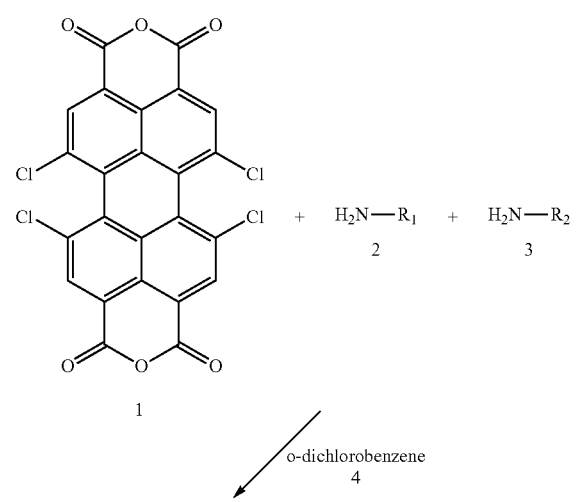

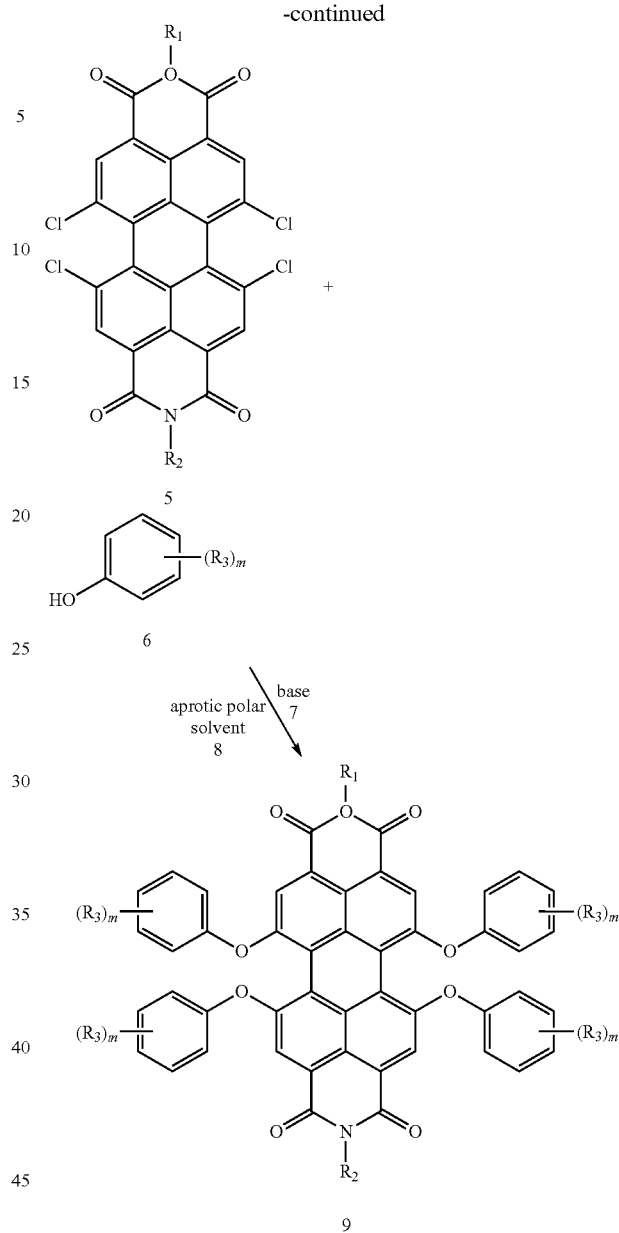

Referring to the above reaction scheme, the method of making a compound of Formula (I) can include condensing a tetrachloroperylene dianhydride 1 with an amine of the formula $H_2N-R_1$ 2 and an amine of the formula $H_2N-R_2$ 3 in o-dichlorobenzene 4. If $R_1$ and $R_2$ are identical, then the dianhydride is condensed with only one amine. The intermediate product 5 formed from the reaction of the tetrachloroperylene dianhydride and amine(s) can be used without purification or separation if desired. The intermediate product is then reacted with a base 6 and a phenol 7 in an aprotic polar solvent 8 to obtain the dye compound 9 of Formula (I). The phenol reacts with the base to form a phenol salt that more easily reacts with the intermediate product. In specific embodiments, the base is a potassium or sodium base. Examples of bases include potassium carbonate ($K_2CO_3$), sodium carbonate, and similar bases. Especially desirable are bases having a pKa of 10 or less. The phenol used to react with the intermediate product generally has the structure of Formula (Ic) or (Id):

Formula (Ic)

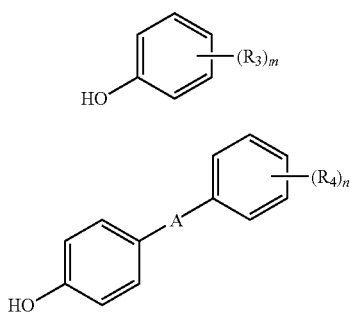

Formula (Id)

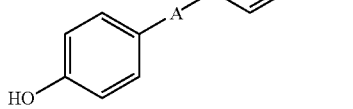

where $R_3$, m, $R_4$, n, and A are as described above. Exemplary phenols include nonyl phenol, p-cumyl phenol, and p-tert-octyl phenol. Suitable aprotic polar solvents include dimethylformamide (DMF); n-methylpyrrolidone (NMP); dimethyl sulfoxide (DMSO); dimethylacetamide, and halogenated solvents like o-dichlorobenzene. The condensing reaction of the tetrachloroperylene dianhydride and amine(s) can be performed at temperatures of from about 80° C. to about 200° C. The condensing reaction may take place over a time period of from about 2 hours to about 10 hours, including from about 4 hours to about 8 hours. The reaction of the intermediate product with the salt and the phenol can be performed at temperatures of from about 80° C. to about 220° C. In more specific embodiments, the temperature is from about 160° C. to about 200° C. The condensing reaction may take place over a time period of from about 30 minutes to about 36 hours. In more specific embodiments, the time period is from about 1 hour to about 28 hours. The reaction of the intermediate product with the base and the phenol may also take place in an inert atmosphere, such as under nitrogen or argon gas. Desirably, the solvent is "dry", i.e. contains as little water as possible. After the dye compound of Formula (I) is formed, it may be purified by column chromatography. The dye compounds are soluble in common solvents like chlorobenzene, dichlorobenzene, toluene, chloroform, dichloromethane, cyclohexane, and n-hexane.

In another particular instance, the perylene-based organic fluorescent dye can have a structure of Formula (VII) and (VIII):

Formula (VII)

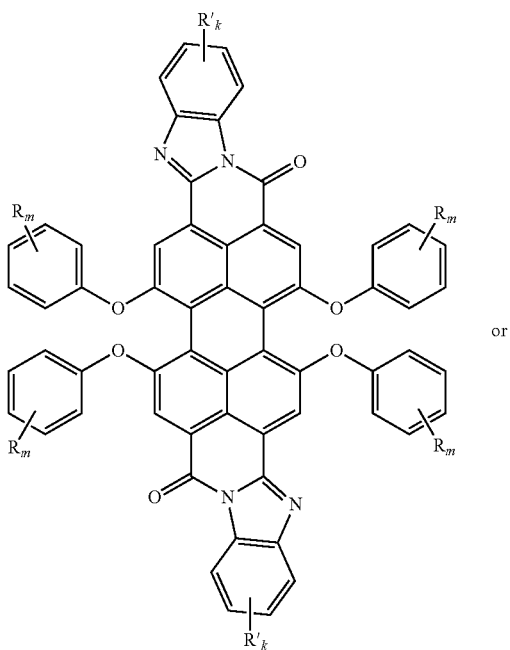

or

Formula (VIII)

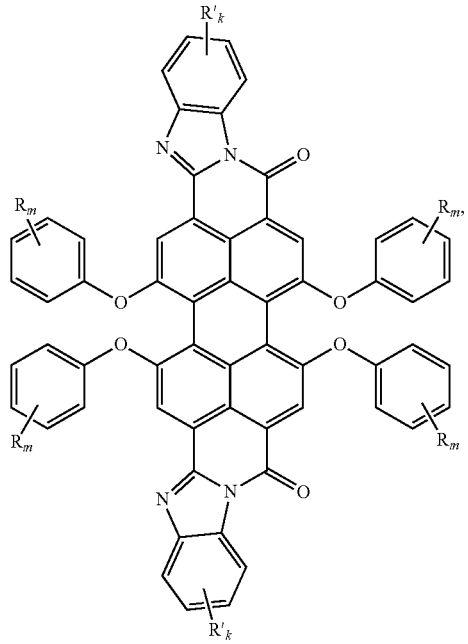

wherein each R and R' is independently selected from $C_1$-$C_{18}$ alkyl, substituted $C_1$-$C_{18}$ alkyl, $C_1$-$C_{18}$ alkoxy, substituted $C_1$-$C_{18}$ alkoxy, and halogen; m represents the number of R substituents on each phenoxy ring, wherein each m is independently an integer from 0 to 5; and k represents the number of R' substitutents on each benzimidazole group, wherein each k is independently an integer from 0 to 4. The compounds can be considered as having a perylene core, two benzimidazole end groups (trans and cis isomers), and four phenoxy side groups. The hydrogen atoms of the alkyl and alkoxy groups may be substituted with, for example, hydroxyl and phenyl groups.

In some specific embodiments, each phenoxy group is substituted in only the para position with an R group independently selected from $C_8$-$C_{18}$ alkyl (with respect to the oxygen atom) (i.e. m=1). In more specific embodiments, the four R groups in the para position are the same. In other specific embodiments, each k is zero.

In particular embodiments, each R and R' is independently selected from $C_8$-$C_{18}$ alkyl, substituted $C_8$-$C_{18}$ alkyl, $C_8$-$C_{18}$ alkoxy, substituted $C_8$-$C_{18}$ alkoxy, and halogen; each m is independently an integer from 0 to 5; and each k is independently an integer from 0 to 4.

Non-limiting examples of compounds of Formulas (VII) and (VIII) are provided below in Formulas (IX), (X), (XI), (XII), (XIII), (IVX):

-continued
Formula (IX)
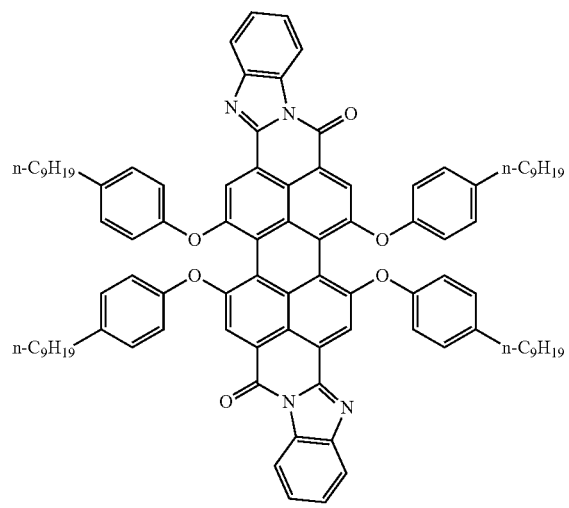
Formula (XII)
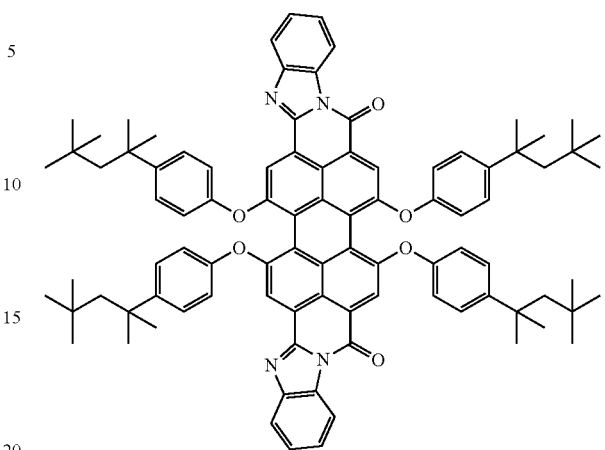
Formula (X)
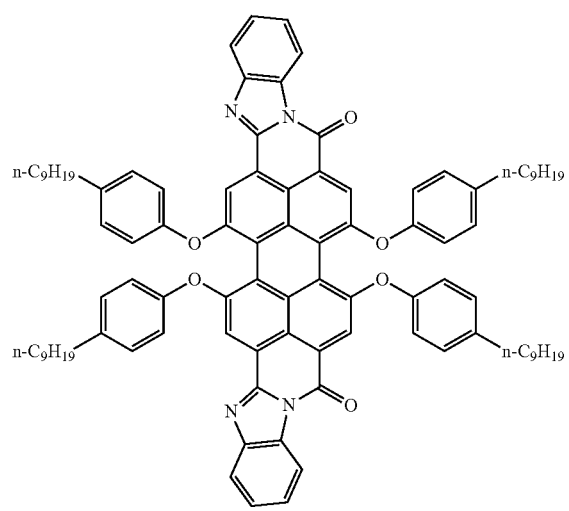
Formula XIII
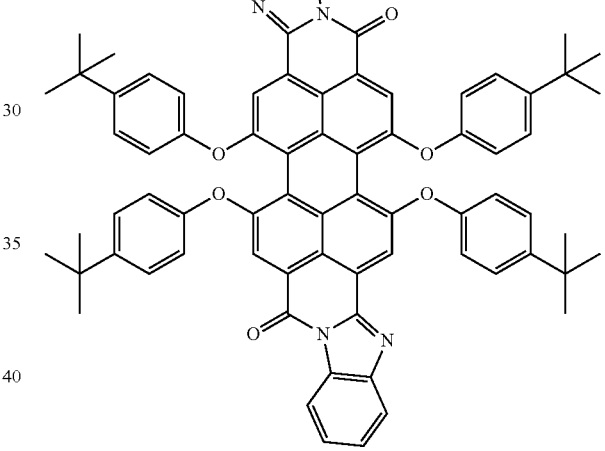
Formula (XI)
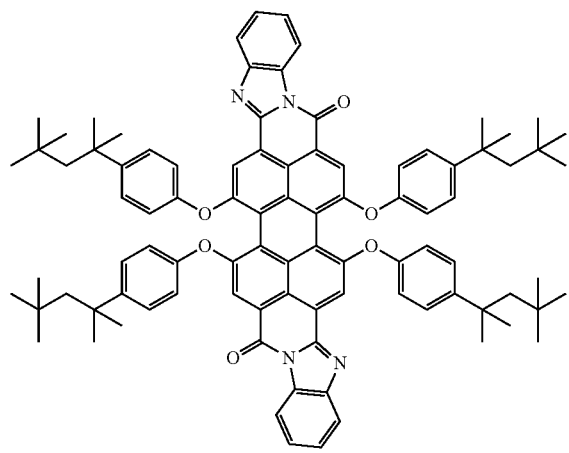
Formula (IVX)
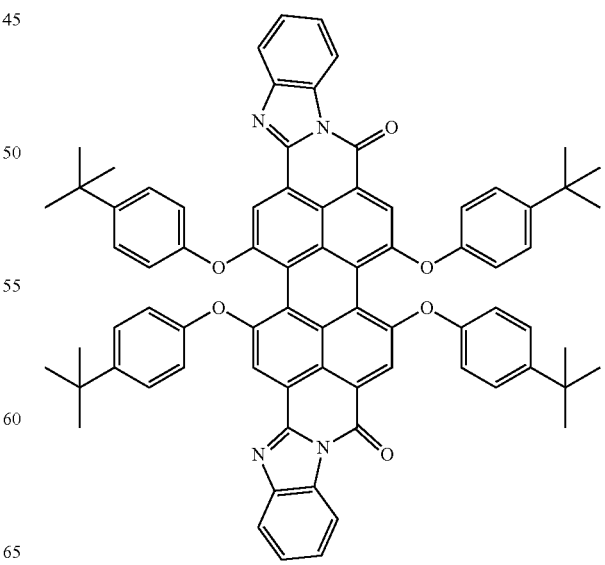

A method for making the above-noted compounds is provided in U.S. Pat. No. 8,299,354, which again is incorporated by reference. In general, the following reaction scheme can be used:

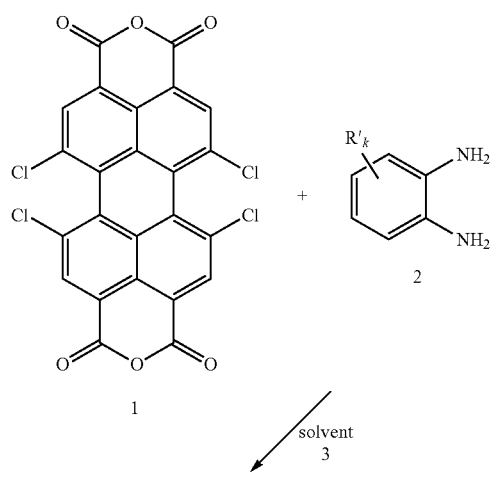

1

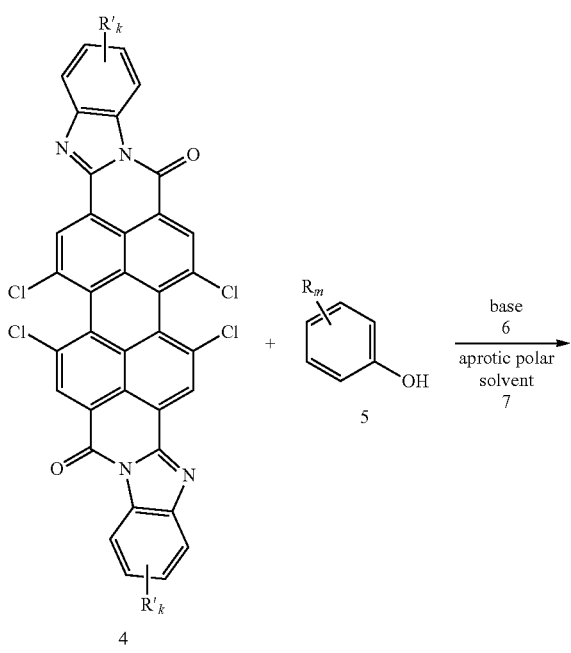

4

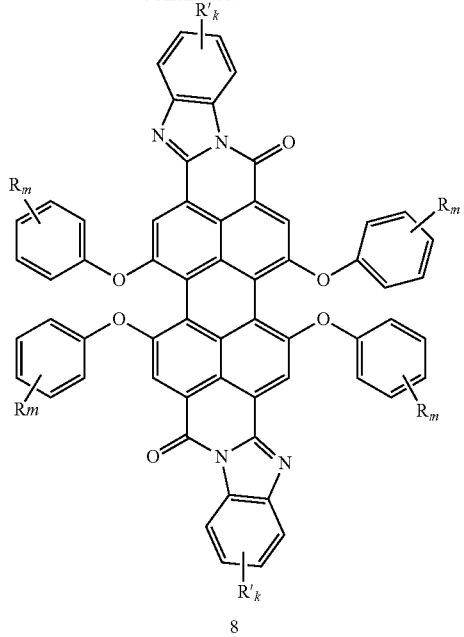

8

Referring to the above reaction scheme, the dye compounds of Formulas (VII) and (VIII) can be synthesized by condensing a tetrachloroperylene dianhydride 1 with an o-phenylene diamine 2 in an appropriate solvent 3. The intermediate product 4 formed from the reaction of the tetrachloroperylene dianhydride and o-phenylene diamine can be used without purification or separation. The intermediate product is then reacted with a base 5 and a phenol 6 in an aprotic polar solvent 7 to obtain the dye compound 8 of Formula (VII) or (VIII) (here, only Formula (VII) is shown). The o-phenylene diamine (also known as diaminobenzene) is used to form the benzimidazole end groups of the dye compound. If desired, substituted o-phenylene diamines may also be used. The o-phenylene diamines may be substituted with $C_1$-$C_{18}$ alkyl, substituted $C_1$-$C_{18}$ alkyl, $C_1$-$C_{18}$ alkoxy, substituted $C_1$-$C_{18}$ alkoxy, and halogen. Appropriate solvents for the condensation of the tetrachloroperylene dianhydride and o-phenylene diamine include propionic acid, acetic acid, imidazole, quinoline, isoquinoline, N-methylpyrrolidone, dimethylformamide, and halogenated solvents like o-dichlorobenzene. The phenol reacts with the base to form a phenol salt that more easily reacts with the intermediate product. In specific embodiments, the base is a potassium or sodium base. Exemplary bases include potassium carbonate ($K_2CO_3$), sodium carbonate, and similar bases. Especially desirable are bases having a pKa of 10 or less. The phenol used to react with the intermediate product generally has the structure of Formula (XV):

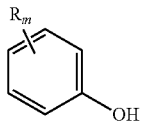

Formula (XV)

where R and m are as described above. Examples of phenols include nonyl phenol; p-tert-butyl phenol; and p-tert-octyl phenol. Suitable aprotic polar solvents include dimethylformamide (DMF); n-methylpyrrolidone (NMP); dimethyl sulfoxide (DMSO); dimethylacetamide; and halogenated solvents like o-dichlorobenzene. The condensing reaction of the tetrachloroperylene dianhydride and o-phenylene diamine can be performed at temperatures of from about 80° C. to about 200° C. The condensing reaction may take place over a time period of from about 3 hours to about 12 hours, including from about 4 hours to about 8 hours. The reaction of the intermediate product with the base and the phenol can be performed at temperatures of from about 80° C. to about 200° C. In more specific embodiments, the temperature is from about 130° C. to about 160° C. The condensing reaction may take place over a time period of from about 4 hours to about 36 hours. In more specific embodiments, the time period is from about 4 hours to about 28 hours. The reaction of the intermediate product with the base and the phenol may also take place in an inert atmosphere, such as under nitrogen or argon gas. Desirably, the solvent is "dry", i.e. contains as little water as possible. After the dye compound of Formula (VII) or (VIII) is formed, it may be purified by column chromatography. The dye compounds are soluble in common solvents like chlorobenzene, dichlorobenzene, toluene, chloroform, and dichloromethane.

In addition to the above-discussed perylene-based dyes, it is also contemplated that other dyes can be used in the context of the present invention. Non-limiting examples of such other dyes include coumarin dyes, carbocyanine dyes, phthalocyanine dyes, oxazine dyes, carbostyryl dyes, porphyrin dyes, acridine dyes, perinone dyes, anthraquinone dyes, arylmethane dyes, quinone imine dyes, thiazole dyes, bis-benzoxazolylthiophene (BBOT) dyes, or xanthene dyes, or any combination of such dyes.

B. Polymer Matrices

The organic fluorescent dyes can be incorporated into a polymeric matrix. One of the advantages of using these dyes is that they can be solubilized within said matrix, thereby providing for a more even distribution of the dyes throughout the matrix when compared with pigments. The polymer matrix/dye combination can be manufactured by methods generally available in the art. For example, the dye compounds of the present invention can be easily incorporated into a wide range of polymers that are used in greenhouse or agricultural films or sheets to grow plants. Non-limiting examples of such polymers include a polycarbonate, a polyolefin, a polymethyl(meth)acrylate, a polyester, an elastomer, a polyvinyl alcohol, a polyvinyl butyral, polystyrene, or a polyvinyl acetate, or any combination thereof. In particular aspects, the polymeric matrix includes a polycarbonate or a polyolefin or a combination thereof.

The fluorescent dyes of the present invention can be added either as a powder or as a solution in a suitable solvent to the polymeric matrix. Generally, the dyes can be distributed within the polymer (e.g., polycarbonate, polyolefin, etc.) by using any means which accomplish the purpose, such as by dispersion. Additives may also be compounded into a masterbatch with a desired polymeric resin and fed into the extruder. The extruder is generally operated at a temperature higher than that necessary to cause the composition to flow. That is, during extrusion the polymer will melt and the dye will solubilize in the polymer composition. The extrudate is immediately quenched in a water bath and pelletized. The pellets, so prepared, when cutting the extrudate may be one-fourth inch long or less as desired. Such pellets may be used for subsequent molding, shaping, or forming. The polymeric matrices may be molded into films, sheets, and other wavelength conversion materials by a variety of means such as injection molding, extrusion, rotational molding, blow molding and thermoforming.

In addition to the organic fluorescent dyes, additives can also be added to the polymeric matrices by the same processes as described above, with a proviso that the additives are selected so as not to adversely affect the desired wavelength conversion properties of the matrices and materials of the present invention. Either a single additive or multiple additives can be used. Such additives may be mixed at a suitable time during the mixing of the components for forming the polymeric matrices of the present invention. Non-limiting examples of additives that may be included in the matrices or materials of the present invention are provided below. The additives can help strengthen the matrices and materials of the present invention, further aid in plant growth, etc. Such additives include, but are not limited to, ultraviolet absorbing compounds, optical brighteners, ultraviolet stabilizing agents, heat stabilizers, diffusers, mold releasing agents, antioxidants, antifogging agents, clarifying agents, nucleating agents, phosphites or phosphonites or both, light stabilizers, singlet oxygen quenchers, processing aids, antistatic agents, fillers or reinforcing materials, or any combination thereof. Each of these additives can be present in amounts of from about 0.0001 to about 10 weight percent, based on the total weight of the polymeric matrix or materials of the present invention.

C. Uses of the Polymeric Matrices

Figure 2:
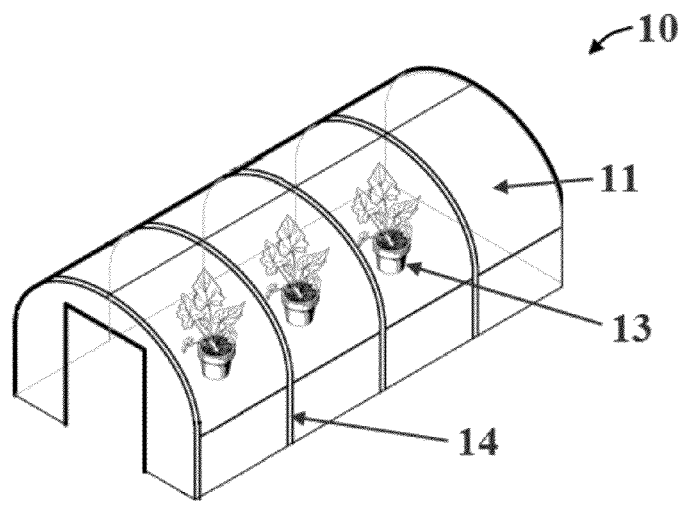
FIG. 2: Illustration of a greenhouse having a transparent wavelength conversion material of the present invention.
Figure 3:
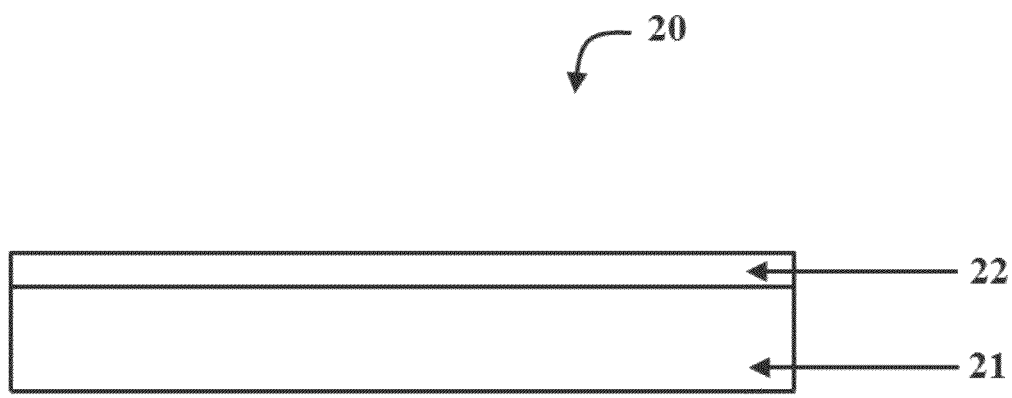
FIG. 3: Cross-sectional view of a window having a portion of its surface covered with a wavelength conversion material of the present invention.

A unique aspect of the present invention is that the polymeric matrices can be used as materials for greenhouses to grow plants in a more efficient and robust manner. In particular aspects, the matrices can be formed into films or sheets to convert unusable light in the context of plant growth (e.g., green or yellow light) into more useable red light. This can result in an increase in the R:FR ratio of light that a plant receives. Non-limiting examples of this are provided in FIGS. 2 and 3. FIG. 2 represents a greenhouse structure (10). The polymeric matrix (11) is in the form of a transparent film or sheet that is capable of converting light that is typically unusable by plants (13) (e.g., green and yellow light) into light that is more usable by plants (13) (e.g., red and far-red light). As explained above, the film or sheet (11) can absorb light at a wavelength of 500 to 700 nm and emit the absorbed light at a wavelength of greater than 550 to 800 nm towards plants (13). In particular embodiments, the film or sheet (11) can absorb light at a wavelength of 500 to 600 nm and emit the absorbed light at a plant (13) at a wavelength of greater than 600 to 800 nm. While the film or sheet (11) is represented as being transparent in FIG. 2, it can also be translucent or opaque in other instances. Further, the greenhouse structure (10) includes a frame (14), which can be used to support the film or sheet (11). Alternatively, the film or sheet (11) can be applied to a transparent or translucent substrate (e.g., glass, window). The transparent or translucent substrate can be incorporated into the greenhouse structure (10). For instance, FIG. 3 provides such a non-limiting embodiment, wherein a transparent or translucent substrate (20) has at least a portion of its surface (21) coated with a film, sheet, or polymeric matrix of the present invention (22). In alternative embodiments, a support or frame (14) does not have to be used. For instance, the film or sheet (11) can simply be used as a cover for plants.

EXAMPLES

The present invention will be described in greater detail by way of specific examples. The following examples are offered for illustrative purposes only, and are not intended to limit the invention in any manner. Those of skill in the art will readily recognize a variety of noncritical parameters which can be changed or modified to yield essentially the same results.

Example 1

Polymeric Matrices

Table 1 provides the compositional characteristics of various types of prepared polymeric matrices:

TABLE 1*

| Plaque # | PC[1] | LLDPE[2] | PET[3] | Irgafos ® 168[4] | NLR[5] | DPP[6] | Diffuser[7] |
|---|---|---|---|---|---|---|---|
| 1 | 1000 | | 2.6 | 0.6 | 0.035 | | 0.5 |
| 2 | 1000 | | 2.6 | 0.6 | 0.07 | | 0.5 |
| 3 | 1000 | | 2.6 | 0.6 | 0.14 | | 0.5 |
| 4 | 1000 | | 2.6 | 0.6 | 0.07 | 0.02 | 0.5 |
| 5 | 1000 | | 2.6 | 0.6 | 0.07 | 0.04 | 0.5 |
| 6 | | 1000 | 2.6 | 0.6 | 0.035 | | |
| 7 | | 1000 | 2.6 | 0.6 | 0.07 | | |
| 8 | | 1000 | 2.6 | 0.6 | 0.14 | | |
| 9 | | 1000 | 2.6 | 0.6 | 0.07 | 0.02 | |
| 10 | | 1000 | 2.6 | 0.6 | 0.07 | 0.04 | |

*All units in grams
[1]Polycarbonate (PC) is Lexan ® 105 PC from SABIC Innovative Plastics.
[2]Linear low density polyethylene (LLDPE) from SABIC.
[3]Polyethylene Terephthalate (PET) from SABIC Innovative Plastics.
[4]Irgafos ® 168 is a trisarylphosphite processing stabilizer/antioxidant that is commercially available from CIBA Specialty Chemicals Inc. (Switzerland).
[5]NLR is the perylene diimide fluorescent dye of Formulas (II) noted above in the specification.
[6]Diketopyrrolopyrrole (DPP) used had the following structure:

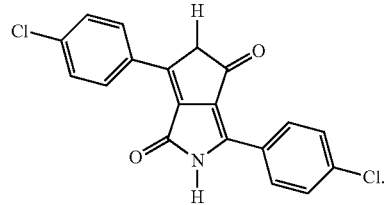 [SMILES: O=C1CC(c2ccc(Cl)cc2)=C2C(=O)NC(c3ccc(Cl)cc3)=C12]

[7]Diffuser is Momentive ™ Tospearl ™ 120 from Momentive Performance Materials Inc.

Figure 4:
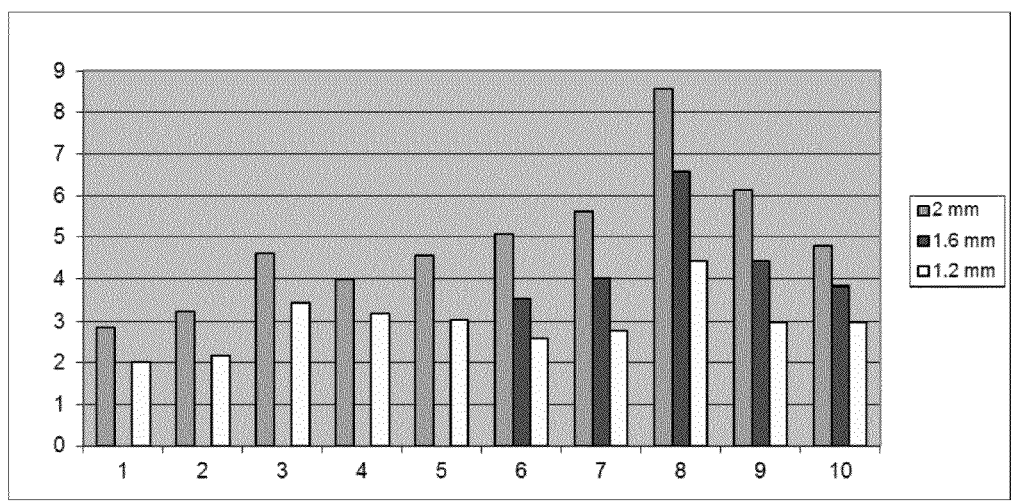
FIG. 4: Light intensity at 660 nm divided by light intensity 730 nm for dye containing plaques based on the DoE sheet.

FIG. 4 provides comparative data on the emission profiles of the matrices from Table 1 at wavelengths of 660 nm (indication of red light) and 730 nm (indication of far-red light). The blank PC does not have any emission and hence the value is taken as unity. As it is observed from the data, when it is compared with blank the presence of the dye increases the R:FR ratio. Plaque 8 at 2 mm thickness from Table 1 provided the largest R:FR ratio (about 8.5). A larger R:FR ratio correlates to more productive plant growth and quality.

Example 2

Process for Making Polymer Matrices

The following process was used to prepare the polymeric matrices of Table 1: Mixed polymer with organic fluorescent dye in a zip-lock polyethylene bag and shake vigorously for about 3-4 minutes. Extruded mixture with a Coperion ZSK25 twin screw extruder under the following conditions in Table 2 to produce polymer pellets in polycarbonate:

TABLE 2

| Feed Zone Temp. (128° C.) | |
|---|---|
| Zone 1 Temp. (280° C.) | Throat/Die Temp. (290° C.) |
| Zone 2 Temp. (285° C.) | Screw Speed (rpm of 300) |

TABLE 2-continued

| Feed Zone Temp. (128° C.) | |
|---|---|
| Zone 3 Temp. (285° C.) | Temp. of Melt (300° C.) |
| Zone 4 Temp. (290° C.) | Torque (Nm) (58-62) |

The produced polymer pellets were then dried in an oven at a constant temperature of about 120° C. for about six (6) hours. Subsequently, the dried pellets were subjected to molding using an LTM-Demag from L&T Plastics Machinery Ltd. under the following conditions in Table 3:

TABLE 3

| Feed Zone Temp. (110° C.) | Cycle Time (125 seconds) |
|---|---|
| Zone 1 Temp. (300° C.) | Injection Time (1.2 seconds) |
| Zone 2 Temp. (290° C.) | Injection Speed (25 mm) |
| Zone 3 Temp. (280° C.) | Injection Pressure (50 bar) |
| Nozzle Temp. (295° C.) | Screw Speed (300 rpm) |
| Temp. of Melt (300° C.) | Holding Pressure (45 bar) |
| Mold Temp. (95° C.) | Holding Time (12 seconds) |
| Sample Drying Time (4 hours) | Cooling Time (15 seconds) |
| Sample Drying Temp. (120° C.) | Thickness of Single Insert (2.54 mm) |

Example 3

Absorption/Emission Data

Additional polymeric matrices were prepared in accordance with the process described in Example 2. Table 4 provides the compositional characteristics of these matrices/plaques. Table 5 provides further characteristics and data for the matrices/plaques described in Table 4

TABLE 4

| Plaque # | PC[1] | PET[3] | Irgafos ® 168[4] | NLR[5] | Nonyl Perinone | DPP[6] | Diffuser[7] |
|---|---|---|---|---|---|---|---|
| 1 | 1000 | 2.6 | 0.6 | | | | |
| 2 | 1000 | 2.6 | 0.6 | 0.2 | | | |
| 3 | 1000 | 2.6 | 0.6 | 0.2 | | | 1 |
| 4 | 1000 | 2.6 | 0.6 | 0.2 | | | 0.5 |
| 5 | 1000 | 2.6 | 0.6 | 0.2 | | .05 | |
| 6 | 1000 | 2.6 | 0.6 | 0.2 | | .05 | 1 |
| 7 | 1000 | 2.6 | 0.6 | | 0.2 | | |
| 8 | 1000 | 2.6 | 0.6 | | 0.2 | | 1 |

*All units in grams
[1]Polycarbonate (PC) is Lexan ® 105 PC from SABIC Innovative Plastics.
[3]Polyethylene Terephthalate (PET) from SABIC Innovative Plastics.
[4]Irgafos ® 168 is a trisarylphosphite processing stabilizer/antioxidant that is commercially available from CIBA Specialty Chemicals Inc. (Switzerland).
[5]NLR is the perylene diimide fluorescent dye of Formulas (II) noted above in the specification.
[6]Nonyl Perinone is perylene perinone of Formula (IX/X) noted above in specification.
[6]Diketopyrrolopyrrole (DPP) used had the following structure:

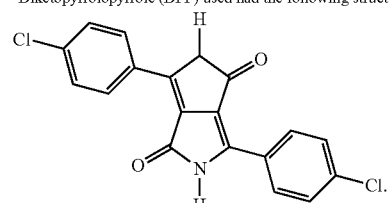

[7]Diffuser is Momentive ™ Tospearl ™ 120 from Momentive Performance Materials Inc.

TABLE 5

| Plaque # | Plaque Description | Thickness (mm) | Units (mV)[1] |
|---|---|---|---|
| 1 | Lexan ® 105 PC | 3 | 6.6 |
| 2 | NLR | 3 | 6.59 |
| 3 | NLR + D | 3 | 12.34 |
| 3 | NLR + D | 2 | 11.95 |
| 4 | NLR + D500 | 2 | 13.1 |
| 5 | NLR + DPP | 2 | 7.6 |
| 6 | NLR + DPP + D | 2 | 12.3 |
| 7 | Nonyl Perinone | 2 | 6.39 |
| 8 | Nonyl Perinone + D | 3 | 10.35 |

[1]The illumination source was a D65 Lighting of Macbeth Color Booth. The spectrum of the D65 lamp is closely related to the spectrum of sunlight. Voltage measurements were carried out on a source meter. These data confirm a two-fold increase in efficiency when compared with the blank polycarbonate plaque.

Figure 5:
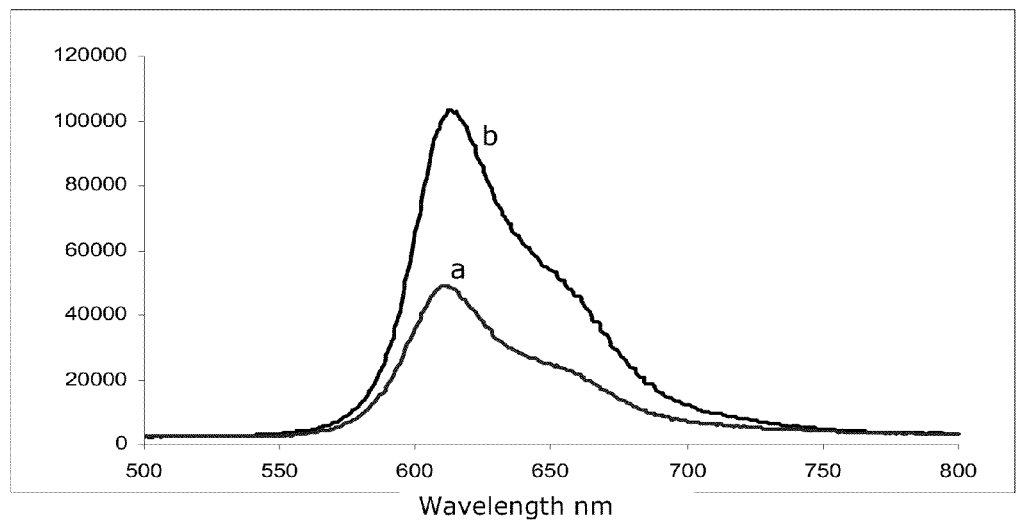
FIG. 5: Emission spectrum of Formula II in 3 mm polycarbonate plaques a) with diffuser and b) without diffuser.

Absorbance and emission profiles of two 3 mm thick plaques one with a diffuser (Tables 4 and 5, plaque 3) and one without a diffuser (Tables 4 and 5, plaque 2) were obtained by using the following process: The ultraviolet-visible (UV-VIS) spectra were recorded on a double beam Perkin-Elmer Lambda 900 UV-VIS-near-infrared (NIR) spectrophotometer. All fluorescence emission and excitation spectra were taken on a SPEX fluorolog 3 (Jobin Yvon, Edison. N.Y.) using double monochromators with 1200 grooves=/mm grating blazed at 330 and 500 nm for excitation and emission selection, respectively, a Hamamatsu R928-P photon counting photomultiplier tube (PMT) for emission detection (referred to as the signal or S channel), and a 450 W continuous Xe lamp as an excitation source. A small fraction of the excitation beam is diverted to a "reference" photodiode just before the sample (referred to as reference or R channel) to monitor the relative excitation intensity as a function of time and excitation wavelength. The voltage of S channel PMT was set to 950 V for all experiments. The emission profiles for plaques 3 and 2 are provided in FIG. 5. The addition of the silica-based diffuser improved the surface emission of the plaque (see FIG. 5).

Figure 6:
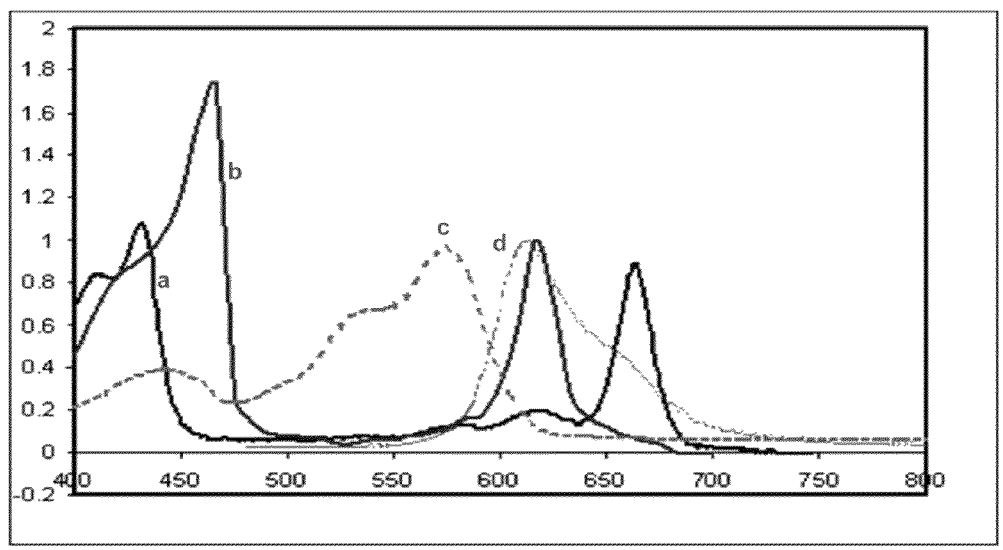
FIG. 6: Absorption spectrum of Chlorophyll A and Chlorophyll B overlapped with absorption and emission of NLR without DPP: a) Chlorophyll A; b) Chlorophyll B; c) Absorption spectrum of NLR; d) Emission spectrum of NLR.

Overlapping the absorbance profiles of chlorophyll A and B with the absorbance and emission profiles of NLR (FIG. 6) indicated that the unused light in the green region can be absorbed by NLR and can be emitted to red region where chlorophyll can efficiently absorb the light, there by managing the red/far red ratio. This has also been shown in the data in Table 1. Since the blank PC does not have any emission the R:FR ratio is assumed to be unity. As the amount of NLR is increased from plaques 1-3 in Table 1, the R:FR ratio is also increased when compared to blank PC. This observation was further validated by a separate experiment (see Table 4, plaques 1 and 3).

Figure 7:
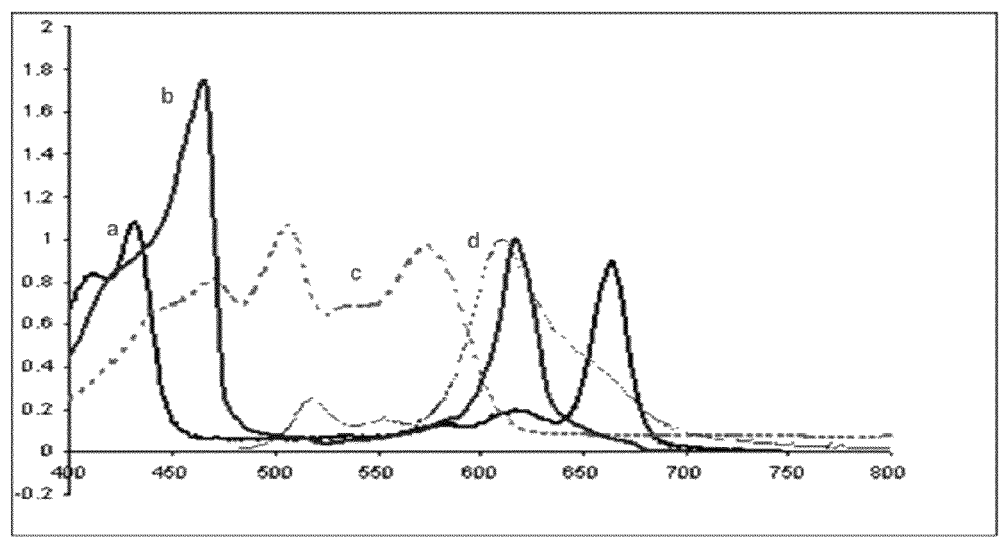
FIG. 7: Absorption spectrum of Chlorophyll A and Chlorophyll B overlapped with absorption and emission of NLR with the addition of DPP: a) Chlorophyll A; b) Chlorophyll B; c) Absorption spectrum of NLR+DPP; d) Emission spectrum of NLR+DPP.

The absorption in the green region can be improved by addition of DPP. The addition of DPP increases the absorption range in the green region. Comparison of plaque 2 with plaques 5 and 6 in Table 1 indicates an increase in R:FR ratio on addition of DPP. Overlapping the absorbance profiles of chlorophyll A and B with the absorbance and emission profiles of NLR and DPP indicate that DPP helps in improved absorption of Green region and emission to red region (FIG. 7). This observation was validated by a separate experiment (see Table 4, plaques 3 and 6).

The invention claimed is:

1. A method of increasing the red to far red (R:FR) ratio of red light that a plant receives comprising:
    (a) converting light comprising a wavelength of 500 to 700 nm into light comprising a wavelength of greater than 550 to 800 nm with a wavelength-conversion material comprising:
        (i) an organic fluorescent dye; and
        (ii) a polymeric matrix,
        wherein the organic fluorescent dye is solubilized into the polymeric matrix, and
        wherein the wavelength conversion material is a film having a thickness of 0.5 to 3 mm, and
    (b) subjecting the plant to the converted light,
    wherein the R:FR ratio of red light that a plant receives is increased by at least 5% or more in the presence of the converted light when compared with the R:FR ratio of red light that a plant receives in the absence of said converted light.

2. The method of claim of 1, wherein the wavelength conversion material is transparent or translucent.

3. The method of claim 1, wherein the film is a single-layered or multi-layered film.

4. The method of claim 1, wherein the material is included in a greenhouse, a terrarium, a conservatory, a herbarium, an arboretum, a nursery, or a bioreactor.

5. The method of claim 1, wherein the organic fluorescent dye or the wavelength-conversion material has a stoke shift of 60 to 120 nm.

6. The method of claim 1, wherein the organic fluorescent dye is thermally stable at a temperature from 200 to 350° C.

7. The method of claim 1, wherein the organic fluorescent dye is capable of absorbing light comprising a wavelength of 500 to 600 nm and emitting the absorbed light at a wavelength of greater than 600 to 800 nm.

8. The method of claim 7, wherein the organic fluorescent dye is a perylene containing compound.

9. The method of claim 8, wherein the perylene containing compound is a perylene diimide.

10. The method of claim 9, wherein the perylene diimide has a structure of:

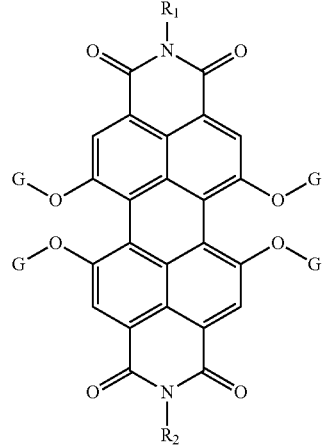

wherein
R$_1$ and R$_2$ are each independently selected from branched C$_6$-C$_{18}$ alkyl and phenyl which is disubstituted by C$_1$-C$_5$ alkyl; and
G is independently selected from

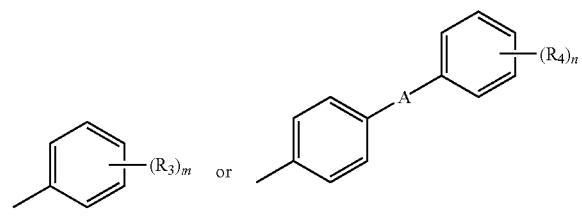

wherein

R$_3$ is independently selected from hydrogen, C$_8$-C$_{12}$ alkyl and halogen;

m represents the number of substituents and is an integer from 0 to 5;

R$_4$ is independently selected from hydrogen, C$_1$-C$_{12}$ alkyl, C$_6$-C$_{20}$ aromatic, and C$_6$-C$_{20}$ cycloalkyl;

n represents the number of substituents and is an integer from 0 to 5; and

A is selected from a bond, C$_1$-C$_{12}$ alkyl, C$_6$-C$_{20}$ aromatic, and C$_6$-C$_{20}$ cycloalkyl.

11. The method of claim 8, wherein the perylene containing compound has a structure of:

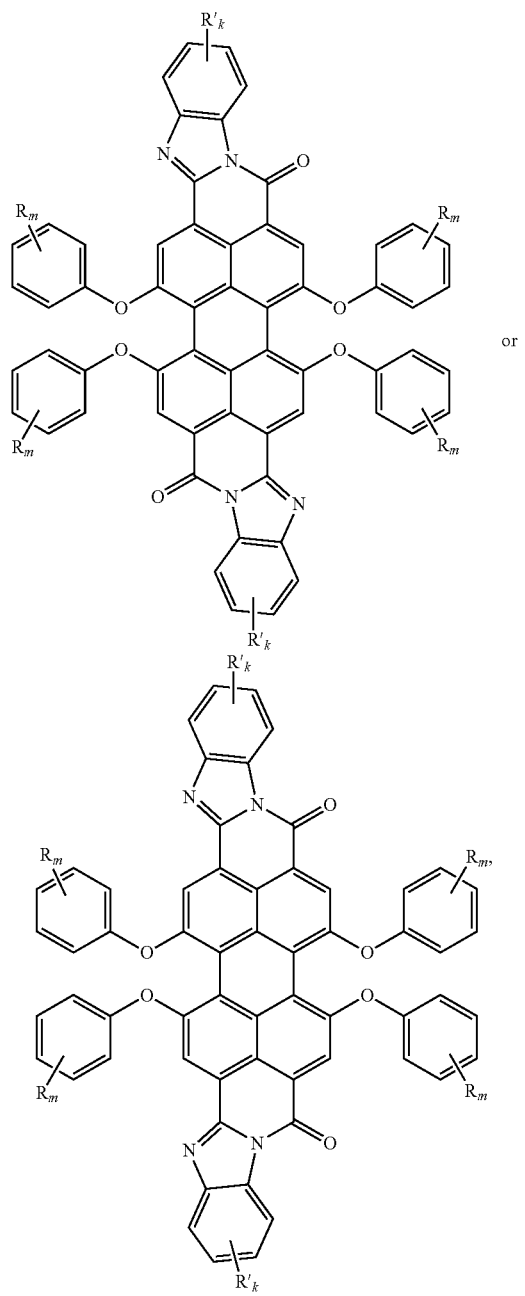

or wherein

R and R' are each independently selected from C$_8$-C$_{18}$ alkyl, substituted C$_8$-C$_{18}$ alkyl, C$_8$-C$_{18}$ alkoxy, substituted C$_8$-C$_{18}$ alkoxy, and halogen;

m represents the number of R substitutents on each phenoxy ring, wherein each m is independently an integer from 0 to 5; and k represents the number of R' substitutents on each benzimidazole group, wherein each k is independently an integer from 0 to 4.

12. The method of claim 8, wherein the perylene organic fluorescent dye is a perinone containing compound.

13. The method of claim 7, further comprising an additional organic fluorescent dye, wherein the organic fluorescent dye is a coumarin dye, a carbocyanine dye, a phthalocyanine dye, an oxazine dye, a carbostyryl dye, a porphyrin dye, an acridine dye, an anthraquinone dye, an arylmethane dye, a quinone imine dye, a thiazole dye, a bis-benzoxazolylthiophene (BBOT) dye, or a xanthene dye, or any combination of dyes thereof.

14. The method of claim 1, wherein the polymeric matrix comprises a polyolefin and wherein the polyolefin is a polyethylene or polypropylene polymer.

15. The method of claim 14, wherein the polyethylene polymer is a low-density polyethylene polymer, a linear low-density polyethylene polymer, or a high-density polyethylene polymer.

16. The method of claim 1, wherein the polymeric matrix further comprises an additive.

17. The method of claim 16, wherein the additive is an ultraviolet absorbing compound, an optical brightener, an ultraviolet stabilizing agent, a heat stabilizer, a diffuser, a mold releasing agent, an antioxidant, an antifogging agent, a clarifier, a nucleating agent, a phosphite or a phosphonite or both, a light stabilizer, a singlet oxygen quencher, a processing aid, an antistatic agent, a filler or a reinforcing material, or any combination thereof.

18. The method of claim 16, wherein the additive is a diketopyrrolo-pyrrole containing compound having a structure of:

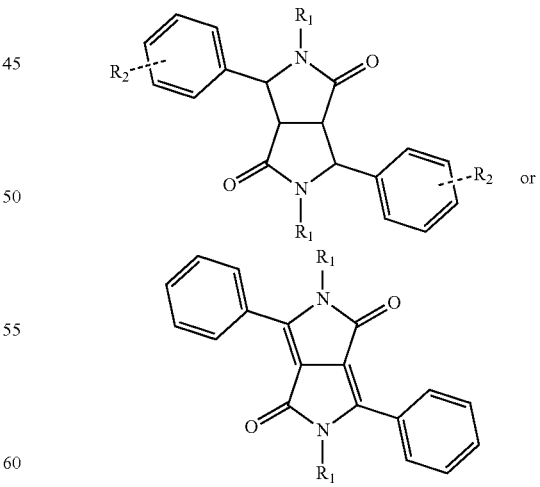

wherein R$_1$ and R$_2$ are each individually H, CH$_3$, CH$_2$H$_5$, 2-ethylhexyl, an amine, or a halogen.

19. The method of claim 16, wherein the polymeric matrix comprises a second, third, fourth, or fifth organic fluorescent dye.

20. The method of claim 19, wherein the ratio of the organic fluorescent dye to the second organic fluorescent dye is 1:50 to 1:1.

21. The method of claim 16, wherein the polymer matrix further comprises an ultraviolet light absorbing compound that is capable of absorbing ultraviolet light comprising a wavelength of 280 to 400 nm.

22. The method of claim 21, wherein the ultraviolet light absorbing compound is capable of emitting said absorbed light in the range of 400 to 800 nm.

23. The method of claim 1, wherein the polymeric matrix further comprises a diffuser.

24. The method of claim 23, wherein the diffuser is a silica-based compound.

25. The method of claim 23, wherein the diffuser is an inorganic material comprising antimony, titanium, barium, or zinc, or oxides thereof, and mixtures thereof.

26. The method of claim 1, wherein the polymeric matrix comprises a polycarbonate.

27. A method of growing a plant comprising:
(a) converting light comprising a wavelength of 500 to 700 nm into light comprising a wavelength of greater than 550 to 800 nm with a wavelength-conversion material comprising;
  (i) an organic fluorescent dye; and
  (ii) a polymeric matrix,
  wherein the organic fluorescent dye is solubilized into the polymeric matrix, and
  wherein the wavelength conversion material is a film having a thickness of 0.5 to 3 mm, and
(b) subjecting the plant to the converted light.

28. A method of increasing the red to far red (R:FR) ratio of red light that a plant receives comprising:
(a) converting light comprising a wavelength of 500 to 700 nm into light comprising a wavelength of greater than 550 to 800 nm with a wavelength-conversion material comprising:
  (i) an organic fluorescent dye, and
  (iii) a polymeric matrix,
  wherein the polymeric matrix comprises a diffuser, and
  wherein the organic fluorescent dye is solubilized into the polymeric matrix, and
(b) subjecting the plant to the converted light,
wherein the R:FR ratio of red light that a plant receives is increased by at least 5% or more in the presence of the converted light when compared with the R:FR ratio of red light that a plant receives in the absence of said converted light.

29. A method of growing a plant comprising:
(a) converting light comprising a wavelength of 500 to 700 nm into light comprising a wavelength of greater than 550 to 800 nm with a wavelength-conversion material comprising;
  (i) an organic fluorescent dye; and
  (ii) a polymeric matrix,
  wherein the polymeric matrix comprises a diffuser, and
  wherein the organic fluorescent dye is solubilized into the polymeric matrix, and
(b) subjecting the plant to the converted light.

30. A method of increasing the red to far red (R:FR) ratio of red light that a plant receives comprising:
(a) converting light comprising a wavelength of 500 to 700 nm into light comprising a wavelength of greater than 550 to 800 nm with a wavelength-conversion material comprising:
  (i) an organic fluorescent dye, and
  (iii) a polymeric matrix,
  wherein the organic fluorescent dye is solubilized into the polymeric matrix, and
  wherein the polymeric matrix comprises an additive selected from:
  (1) a diketopyrrolo-pyrrole containing compound having a structure of:

wherein $R_1$ and $R_2$ are each individually H, $CH_3$, $CH_2H_5$, 2-ethylhexyl, an amine, or a halogen,
  (2) a second organic fluorescent dye, wherein the ratio of the organic fluorescent dye to the second organic fluorescent dye is 1:50 to 1:1, or
  (3) an ultraviolet light absorbing compound that is capable of absorbing ultraviolet light comprising a wavelength of 280 to 400 nm and emitting said absorbed light in the range of 400 to 800 nm,
  and
(b) subjecting the plant to the converted light,
wherein the R:FR ratio of red light that a plant receives is increased by at least 5% or more in the presence of the converted light when compared with the R:FR ratio of red light that a plant receives in the absence of said converted light.

31. A method of growing a plant comprising:
(a) converting light comprising a wavelength of 500 to 700 nm into light comprising a wavelength of greater than 550 to 800 nm with a wavelength-conversion material comprising;
  (i) an organic fluorescent dye; and
  (ii) a polymeric matrix,
  wherein the organic fluorescent dye is solubilized into the polymeric matrix, and
  wherein the polymeric matrix comprises an additive selected from:
  (1) a diketopyrrolo-pyrrole containing compound having a structure of:

-continued

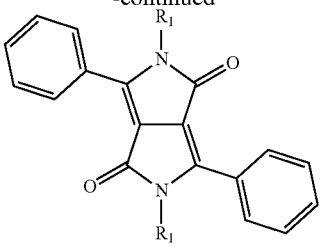

wherein $R_1$ and $R_2$ are each individually H, $CH_3$, $CH_2H_5$, 2-ethylhexyl, an amine, or a halogen, (2) a second organic fluorescent dye, wherein the ratio of the organic fluorescent dye to the second organic fluorescent dye is 1:50 to 1:1, or (3) an ultraviolet light absorbing compound that is capable of absorbing ultraviolet light comprising a wavelength of 280 to 400 nm and emitting said absorbed light in the range of 400 to 800 nm, (b) subjecting the plant to the converted light.

32. A method of increasing the red to far red (R:FR) ratio of red light that a plant receives comprising:

(a) converting light comprising a wavelength of 500 to 700 nm into light comprising a wavelength of greater than 550 to 800 nm with a wavelength-conversion material comprising:

(i) an organic fluorescent dye, and (iii) a polymeric matrix, wherein the organic fluorescent dye is solubilized into the polymeric matrix, and wherein organic fluorescent dye is:

(1) a perylene organic fluorescent dye having a perinone containing compound; or (2) a perylene containing compound having a structure of:

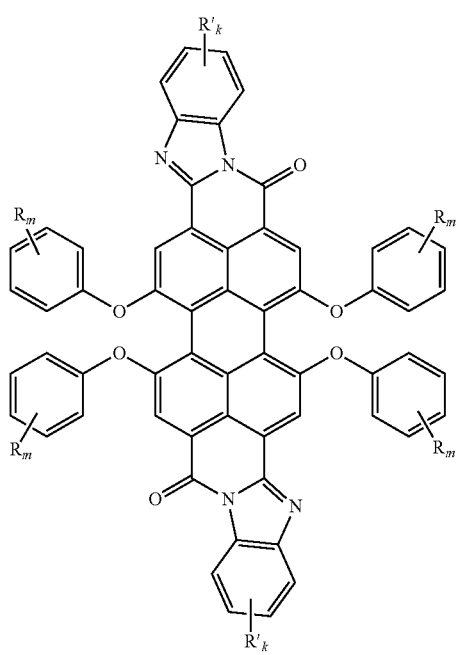

or

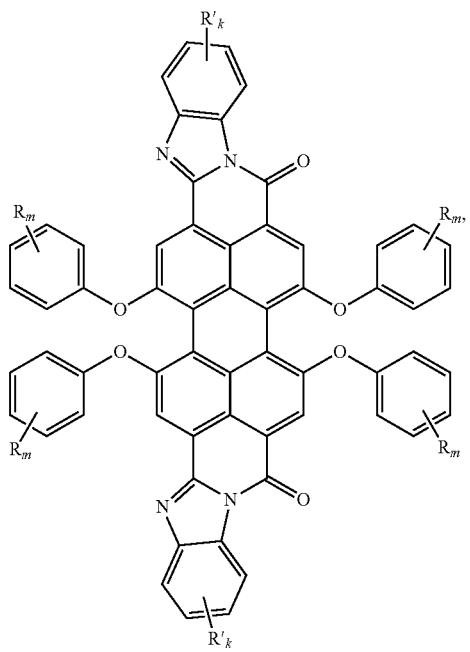

wherein

R and R' are each independently selected from $C_8$-$C_{18}$ alkyl, substituted $C_8$-$C_{18}$ alkyl, $C_8$-$C_{18}$ alkoxy, substituted $C_8$-$C_{18}$ alkoxy, and halogen;

m represents the number of R substitutents on each phenoxy ring, wherein each m is independently an integer from 0 to 5; and k represents the number of R' substitutents on each benzimidazole group, wherein each k is independently an integer from 0 to 4, and (b) subjecting the plant to the converted light, wherein the R:FR ratio of red light that a plant receives is increased by at least 5% or more in the presence of the converted light when compared with the R:FR ratio of red light that a plant receives in the absence of said converted light.

33. A method of growing a plant comprising:

(a) converting light comprising a wavelength of 500 to 700 nm into light comprising a wavelength of greater than 550 to 800 nm with a wavelength-conversion material comprising;

(i) an organic fluorescent dye; and (ii) a polymeric matrix, wherein the organic fluorescent dye is solubilized into the polymeric matrix, and wherein organic fluorescent dye is:
(1) a perylene organic fluorescent dye having a perinone containing compound; or
(2) a perylene containing compound having a structure of:

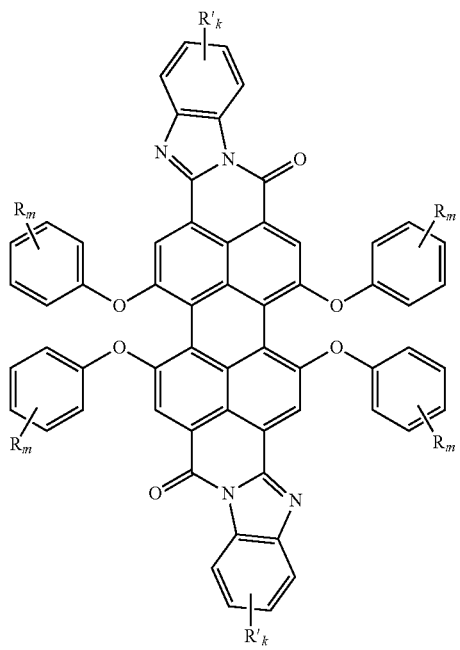

or

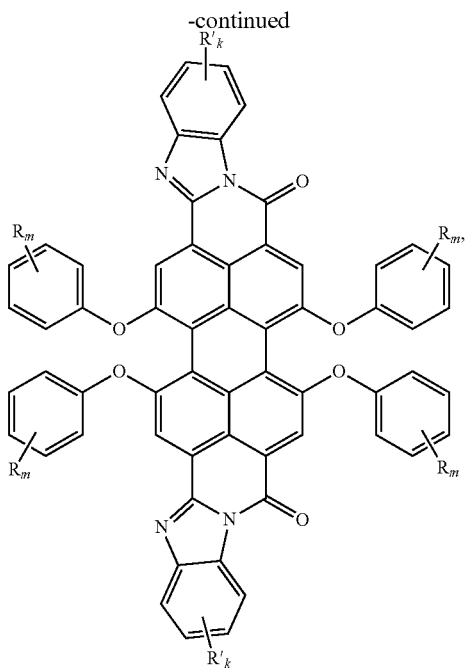

wherein
R and R' are each independently selected from $C_8$-$C_{18}$ alkyl, substituted $C_8$-$C_{18}$ alkyl, $C_8$-$C_{18}$ alkoxy, substituted $C_8$-$C_{18}$ alkoxy, and halogen;
m represents the number of R substitutents on each phenoxy ring, wherein each m is independently an integer from 0 to 5; and
k represents the number of R' substitutents on each benzimidazole group, wherein each k is independently an integer from 0 to 4,
and
(b) subjecting the plant to the converted light.

* * * * *

UNITED STATES PATENT AND TRADEMARK OFFICE
CERTIFICATE OF CORRECTION

| | | |
|---|---|---|
| PATENT NO. | : 9,204,598 B2 | Page 1 of 1 |
| APPLICATION NO. | : 13/937963 | |
| DATED | : December 8, 2015 | |
| INVENTOR(S) | : Suresh Velate et al. | |

It is certified that error appears in the above-identified patent and that said Letters Patent is hereby corrected as shown below:

On the Title page in item (73) Assignee, "Indsutries" should read --Industries--.

In Claim 28 on Column 29, line 39, "(iii)" should read --(ii)--.

In Claim 30 on Column 29, line 67, "(iii)" should read --(ii)--.

In Claim 32 on Column 31, line 31, "(iii)" should read --(ii)--.

Signed and Sealed this
Twenty-second Day of March, 2016

Michelle K. Lee
*Director of the United States Patent and Trademark Office*